(12) United States Patent
Suzuki et al.

(10) Patent No.: US 11,114,127 B2
(45) Date of Patent: Sep. 7, 2021

(54) MAGNETIC DISK DEVICE HAVING FIRST AND SECOND ASSIST ELEMENTS AND WRITE OPERATION METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hiroyuki Suzuki, Kamakura Kanagawa (JP); Akihiko Takeo, Kokubunji Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/806,585

(22) Filed: Mar. 2, 2020

(65) Prior Publication Data

US 2021/0090605 A1    Mar. 25, 2021

(30) Foreign Application Priority Data

Sep. 19, 2019    (JP) .............................. JP2019-170318

(51) Int. Cl.
| | | |
|---|---|---|
| *G11B 11/105* | (2006.01) | |
| *G11B 20/10* | (2006.01) | |
| *G11B 5/187* | (2006.01) | |
| *G11B 5/00* | (2006.01) | |
| *G11B 7/126* | (2012.01) | |
| *G11B 5/60* | (2006.01) | |

(52) U.S. Cl.
CPC .............. *G11B 20/10* (2013.01); *G11B 5/187* (2013.01); *G11B 5/6088* (2013.01); *G11B 7/126* (2013.01); *G11B 2005/001* (2013.01); *G11B 2005/0021* (2013.01); *G11B 2005/0024* (2013.01); *G11B 2020/10898* (2013.01)

(58) Field of Classification Search
None
See application file for complete search history.

(56) References Cited

U.S. PATENT DOCUMENTS

| | | |
|---|---|---|
| 7,525,765 B2 | 4/2009 | Kurita et al. |
| 8,553,362 B2 | 10/2013 | Tanabe et al. |
| 9,099,102 B2 | 8/2015 | Katada et al. |

(Continued)

*Primary Examiner* — Tan X Dinh
(74) *Attorney, Agent, or Firm* — Kim & Stewart LLP

(57) ABSTRACT

According to one embodiment, a magnetic disk device includes: a disk; a head including a main magnetic pole, a write shield that faces the main magnetic pole in a first direction and is separated from the main magnetic pole by a gap, a first assist element that is disposed in the gap and a second assist element that is disposed in the gap and is positioned relative to the first assist element in a second direction intersecting the first direction; and a controller configured to: cause a first assist energy from the first assist element to be applied to the disk and affect a coercive force of the disk; and cause a second assist energy from the second assist element to be applied to the disk and affect a coercive force of the disk, wherein the first assist energy is different from the second assist energy.

15 Claims, 11 Drawing Sheets

(56) References Cited

U.S. PATENT DOCUMENTS

| | | | | |
|---|---|---|---|---|
| 2002/0018312 | A1* | 2/2002 | Hamamoto | G11B 5/00 |
| | | | | 360/59 |
| 2006/0024529 | A1* | 2/2006 | Murakami | G11B 5/1278 |
| | | | | 428/810 |
| 2006/0114590 | A1* | 6/2006 | Hamaguchi | G11B 5/1278 |
| | | | | 360/59 |
| 2006/0114591 | A1* | 6/2006 | Taguchi | G11B 5/0275 |
| | | | | 360/59 |
| 2013/0229895 | A1* | 9/2013 | Shiroishi | G11B 5/3146 |
| | | | | 369/13.14 |
| 2013/0242430 | A1* | 9/2013 | Aoyama | G11B 5/65 |
| | | | | 360/110 |
| 2013/0250449 | A1* | 9/2013 | Oikawa | G11B 5/1278 |
| | | | | 360/59 |
| 2014/0241138 | A1* | 8/2014 | Hirata | G11B 5/607 |
| | | | | 369/13.33 |
| 2014/0286147 | A1* | 9/2014 | Aoki | G11B 5/6088 |
| | | | | 369/13.17 |
| 2015/0117168 | A1* | 4/2015 | Matsumoto | G11B 5/314 |
| | | | | 369/13.17 |
| 2016/0180867 | A1* | 6/2016 | Takagishi | G11B 5/09 |
| | | | | 360/39 |
| 2016/0225392 | A1* | 8/2016 | Takeo | G11B 5/3166 |

* cited by examiner

MAGNETIC DISK DEVICE HAVING FIRST AND SECOND ASSIST ELEMENTS AND WRITE OPERATION METHOD

CROSS-REFERENCE TO RELATED APPLICATION(S)

This application is based upon and claims the benefit of priority from Japanese Patent Application No. 2019-170318, filed Sep. 19, 2019, the entire contents of which are incorporated herein by reference.

FIELD

Embodiments described herein relate generally to a magnetic disk device and a write operation method.

BACKGROUND

In order to achieve an increase in recording density and recording capacity of a magnetic disk device, high-frequency assisted recording (microwave assisted magnetic recording: MAMR), thermally assisted magnetic recording (TAMR), and the like have been developed. The high-frequency assisted recording is a technique in which a high-frequency magnetic field that is generated by applying a current to a high-frequency oscillator is applied to a disk using a magnetic head such that the coercive force of a portion of the disk to which the high-frequency magnetic field is applied is reduced. Generally, for high-frequency assisted recording the magnetic head includes: a recording magnetic pole (main magnetic pole) that is excited and generates a recording magnetic field when a recording current is applied thereto and the high-frequency oscillator. The thermally assisted magnetic recording is a technique in which a disk is irradiated with irradiation light emitted from a tip of a light irradiation element using a magnetic head to locally heat the disk such that the coercive force of a heated portion of the disk is reduced. Generally, for thermally assisted magnetic recording, the magnetic head includes the light irradiation element that irradiates the disk with the irradiation light. Currently, a high-frequency assisted recording or thermally assisted magnetic recording magnetic disk device including a plurality of assist elements is considered.

DETAILED DESCRIPTION

Embodiments provide a magnetic disk device that includes: a disk; a head including a main magnetic pole, a write shield that faces the main magnetic pole in a first direction and is separated from the main magnetic pole by a gap, a first assist element that is disposed in the gap and a second assist element that is disposed in the gap and is positioned relative to the first assist element in a second direction intersecting the first direction; and a controller configured to: cause a first assist energy from the first assist element to be applied to the disk and affect a coercive force of the disk; and cause a second assist energy from the second assist element to be applied to the disk and affect a coercive force of the disk, wherein the first assist energy is different from the second assist energy.

Hereinafter, an embodiment will be described with reference to the drawings. The drawings merely illustrate examples and do not limit the scope of the embodiment.

Embodiment

Figure 1:
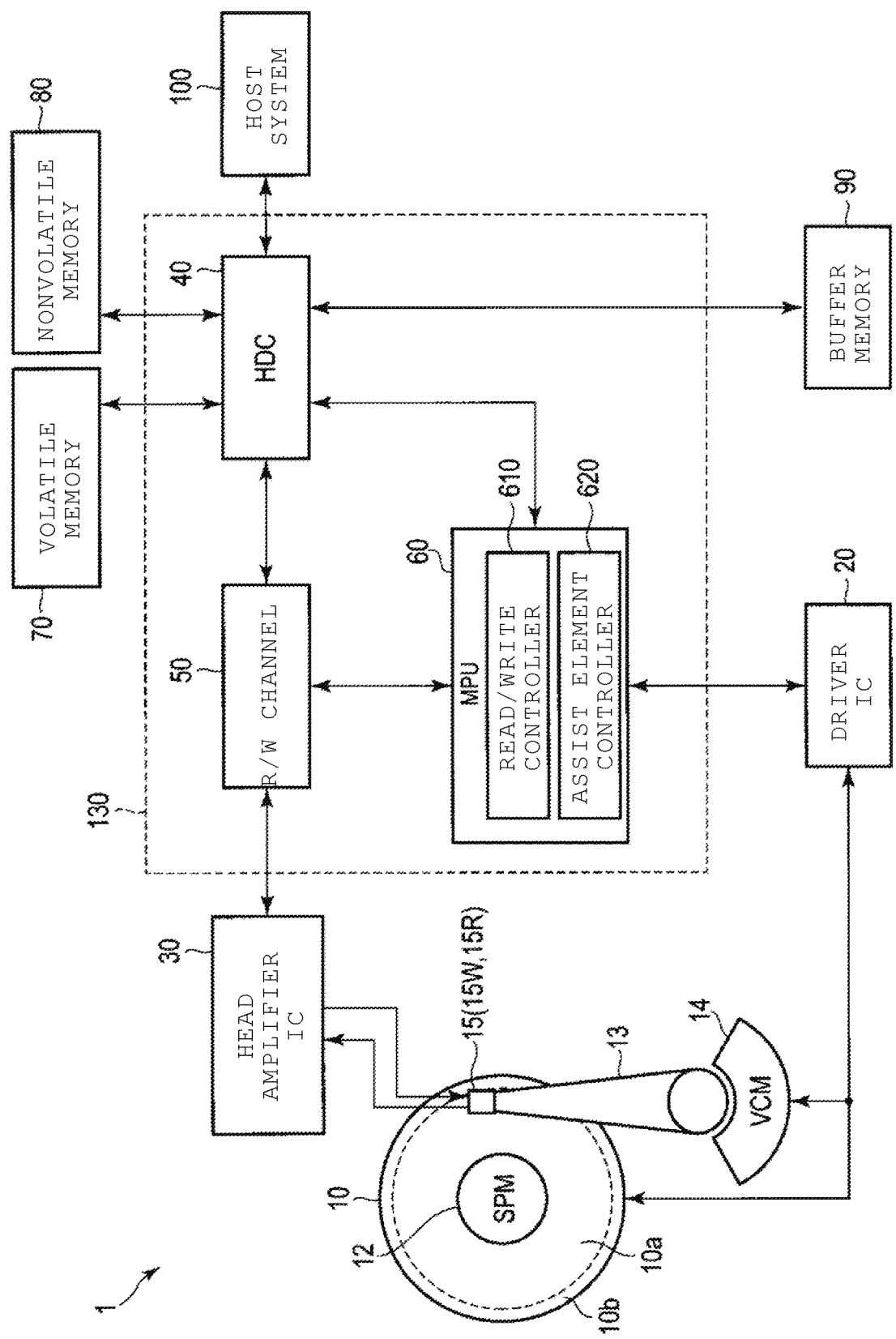
FIG. 1 is a block diagram illustrating a configuration of a magnetic disk device according to an embodiment.

FIG. 1 is a block diagram illustrating a configuration of a magnetic disk device 1 according to the embodiment.

The magnetic disk device 1 includes a head disk assembly (HDA) described below, a driver IC 20, a head amplifier integrated circuit (hereinafter, referred to as "head amplifier IC" or "preamplifier") 30, a volatile memory 70, a nonvolatile memory 80, a buffer memory (buffer) 90, a system controller 130 that is an integrated circuit of one chip. In addition, the magnetic disk device 1 is connected to a host system (hereinafter, referred to as "host") 100.

The HDA includes a magnetic disk (hereinafter, referred to as "disk") 10, a spindle motor (hereinafter, referred to as "SPM") 12, an arm 13 on which the head 15 is mounted, and a voice coil motor (hereinafter, referred to as "VCM") 14. The disk 10 is attached to the SPM 12 and rotates due to the driving of the SPM 12. The arm 13 and the VCM 14 constitute an actuator. Due to the driving of the VCM 14, the actuator moves the head 15 mounted on the arm 13 to a predetermined position of the disk 10. The numbers of disks 10 and heads 15 included in the magnetic disk device 1 may be two or more.

In the disk 10, there is generally a user data area 10a that is usable by a user and a system area 10b where information required for system management is written. The user data area 10a and the system area 10b are each assigned to an area where data is writable. Hereinafter, a direction perpendicular to a radial direction of the disk 10 will be referred to as "circumferential direction". In addition, a predetermined position in the radial direction of the disk 10 will also be referred to as "radial position", and a predetermined position in the circumferential direction of the disk 10 will also be referred to as "circumferential position". A combination of a radial position and a circumferential position will also be collectively referred to as a "position".

The head 15 includes a slider as a main body and includes a write head 15W and a read head 15R mounted on the slider. The write head 15W writes data to the disk 10. The read head 15R reads data written in the disk 10. The write head 15W will also be simply referred to as "head 15", the read head 15R will also be simply referred to as "head 15", and the write head 15W and the read head 15R will be collectively referred to as "head 15". A center portion of the head 15 will also be referred to as "head 15", a center portion of the write head 15W will also be referred to as "write head 15W", and a center portion of the read head 15R will also be referred to as "read head 15R". "Track" is used as one region among a plurality of regions divided in the radial direction of the disk 10, data that extends in the circumferential direction of the disk 10, data that is written in the track, and other various meanings. The track includes a plurality of sectors. "Sector" is used as one region among a plurality of regions into which a particular track is divided in the circumferential direction, data that is written in a predetermined position of the disk 10, data that is written in the sector, and various other meanings. The width of a track in the radial direction will be referred to as "track width", and a center position of the track width will be referred to as "track center".

Figure 2:
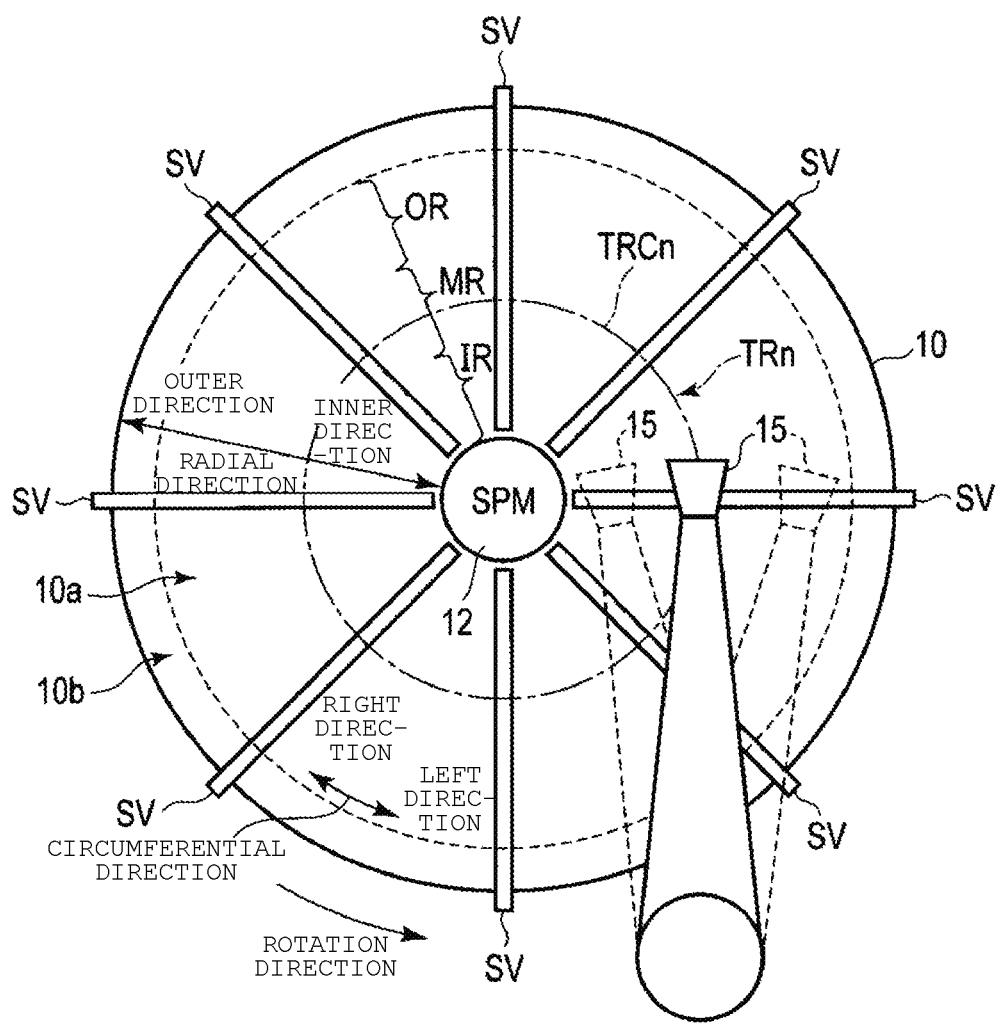
FIG. 2 is a schematic diagram illustrating an example of the arrangement of a head relative to the disk according to the embodiment.

FIG. 2 is a schematic diagram illustrating an example of the arrangement of the head 15 relative to the disk 10 according to the embodiment. As illustrated in FIG. 2, in the radial direction, a direction toward the outer circumference of the disk 10 will be referred to as an "outer direction" (outside), and a direction opposite to the outer direction will be referred to as an "inner direction" (inside). In addition, as illustrated in FIG. 2, in the circumferential direction, a right rotation (clockwise) direction relative to the disk 10 will be referred to as the "right direction", and a direction opposite to (counterclockwise) the right rotation direction will be referred to as the "left direction". In the circumferential direction, a direction in which the disk 10 rotates will be referred to as a "rotation direction". In FIG. 2, the rotation direction is the left direction. The rotation direction may be reversed (right direction). In FIG. 2, the user data area 10a is divided into an inner circumferential region IR that is positioned in the inner direction from the system area 10b, an outer circumferential region OR that is positioned in the outer direction from the inner circumferential region IR, and an intermediate circumferential region MR that is positioned between the inner circumferential region IR and the outer circumferential region OR. In FIG. 2, a track center TRCn of a track TRn is illustrated. The track center TRCn is positioned in the intermediate circumferential region MR. The track center TRCn may be positioned in the inner circumferential region IR or may be positioned in the outer circumferential region OR. The track center TRCn is positioned, for example, to be concentric with the disk 10. The track center TRCn is not necessarily circular. The track center TRCn is not necessarily concentric with the disk 10.

The disk 10 includes a plurality of servo data areas SV. Hereinafter, the servo data area SV will also be referred to as "servo pattern SV". The servo data areas SV radially extends over a plurality of tracks in the radial direction of the disk 10 and are discretely arranged at predetermined intervals in the circumferential direction. The servo data area SV includes a plurality of servo sectors. The servo sector includes servo data for positioning the head 15 at a predetermined radial position of the disk 10, for example, a predetermined track. An area where user data or the like is written is arranged between two servo data areas that are continuously arranged in the circumferential direction. The servo data area SV may be a pattern having one stripe shape from the inner circumference to the outer circumference of the disk 10.

When the head 15 is positioned in the track center TRCn, a skew angle is, for example, 0°. Hereinafter, when the head 15 is positioned, a radial position where the skew angle is 0° will also be referred to as "reference position". As the head 15 moves from the reference position (track center TRCn) to the outer direction in the radial direction, the absolute value of the skew angle increases. In addition, as the head 15 moves from the reference position (track center TRCn) to the inner direction in the radial direction, the absolute value of the skew angle increases.

Figure 3:
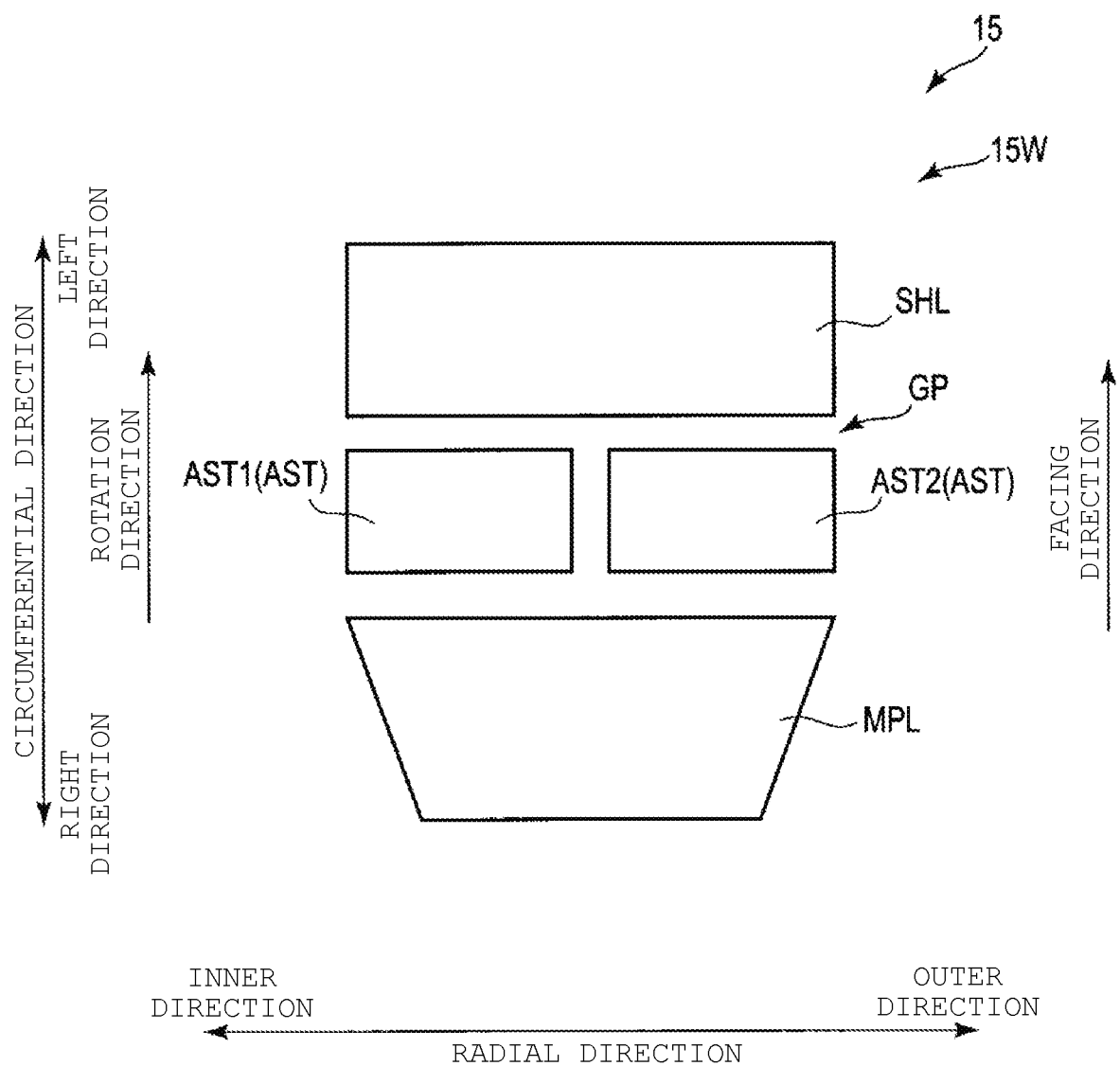
FIG. 3 is a schematic diagram illustrating a configuration example of a write head according to the embodiment.

FIG. 3 is a schematic diagram illustrating a configuration example of the write head 15W according to the embodiment. FIG. 3 schematically illustrates a part of the write head 15W facing the disk 10.

The write head 15W includes a main magnetic pole MPL, a trailing shield (write shield) SHL, and a plurality of assist elements AST, for example, assist elements AST1 and AST2. The write head 15W may include three or more assist elements AST.

The main magnetic pole MPL is formed of a soft magnetic material having a high saturation magnetic flux density. In order to magnetize the disk 10, the main magnetic pole MPL generates a recording magnetic field in a direction perpendicular to a surface of the disk 10. Hereinafter, the main magnetic pole MPL will also be referred to as "recording magnetic pole".

The write shield SHL faces the main magnetic pole MPL with a gap GP disposed therebetween. The write shield SHL is formed of a soft magnetic material having a high saturation magnetic flux density. The write shield SHL is configured to efficiently close a magnetic path through the disk 10 immediately below the main magnetic pole MPL. The main magnetic pole MPL and the write shield SHL are electrically insulated from each other and form a magnetic circuit. In the main magnetic pole MPL and the write shield SHL, a recording magnetic field is excited when a current having a predetermined size (also referred to as "recording current", "write current", or "recording capability") is supplied from the head amplifier IC 30 to a recording coil wound around the magnetic circuit that includes the main magnetic pole MPL and the write shield SHL. The main magnetic pole MPL and the write shield SHL will also be referred to as "recording magnetic pole".

The assist elements AST (AST1, AST2) are disposed between the main magnetic pole MPL and the write shield SHL. In an example illustrated in FIG. 3, the assist elements AST1 and AST2 are disposed in the gap GP. The assist elements AST are arranged in a direction intersecting a direction (hereinafter, also referred to as "facing direction") from the main magnetic pole MPL toward the write shield SHL. A direction from the write shield SHL toward the main magnetic pole MPL may be referred to as the "facing direction". That is, the facing direction corresponds to a direction in which the write shield SHL and the main magnetic pole MPL are arranged. The facing direction is not necessarily parallel to the circumferential direction. In addition, the facing direction does not necessarily intersect the radial direction. For example, the assist elements AST are arranged in the direction intersecting the facing direction. In the example illustrated in FIG. 3, the assist elements AST1 and AST2 are arranged in the direction intersecting the facing direction. In the example illustrated in FIG. 3, the assist element AST1 is positioned relative to the assist element AST2 in the inner direction. The assist element AST2 is positioned relative to the assist element AST1 in the outer direction.

For example, the assist elements AST may have different characteristics. In one example, the assist elements AST may be formed of different materials. In addition, in another example, the assist elements AST may have different thicknesses in the facing direction. By allowing the characteristics of the respective assist elements AST to be different from each other, energies (hereinafter also referred to as "assist energies") to be generated and applied from the respective assist elements AST to the disk 10, for example, currents (hereinafter, also referred to as "assist currents") or voltages (hereinafter, also referred to as "assist voltages") to be applied to the respective assist elements at which a high-frequency magnetic field or near-field light is the maximum may be different from each other. Here, the assist energy corresponds to energy that affects the coercive force of the disk 10 to improve the write performance of the write head 15W to the disk 10.

The assist element AST is, for example, a high-frequency assist element for executing high-frequency assisted recording. Examples of the high-frequency assist element include a spin torque oscillator. The spin torque oscillator has, for example, a structure that includes an underlayer that is formed of a nonmagnetic conductive layer, a spin injection layer, an intermediate layer, an oscillation layer, and a gap layer that is formed of a nonmagnetic conductive layer. These layers are stacked in the above order between the main magnetic pole MPL and the write shield SHL. In the spin torque oscillator, magnetization uniformly rotates (precession of spins) due to a gap magnetic field generated in a write gap when a predetermined assist voltage or a predetermined assist current is applied, and a high-frequency magnetic field (e.g., microwave) having a sufficiently higher frequency than that of a recording signal is generated and applied to the disk 10. The spin torque oscillator applies a high-frequency magnetic field to a magnetic recording layer of the disk 10 such that the coercive force of the magnetic recording layer is reduced.

In this example, when a plurality of high-frequency assist elements are provided, for example, the high-frequency assist element AST1 and the high-frequency assist element AST2 may each include magnetic films having different magnetic characteristics. Alternatively, AST1 and AST2 may each have different layer thicknesses or different cross-sectional areas. In this case, AST1 and AST2 are in a state where oscillation frequencies or microwave intensities are different irrespective of the set current value. That is, even when the same assist current is applied to AST1 and AST2 simultaneously, the coercive force effect of the magnetic recording layer obtained by microwaves to be applied from AST1 and AST2 to the disk 10 can be adjusted at different levels. Alternatively, in another high-frequency assist head configuration, the high-frequency assist elements AST1 and AST2 have the same film configuration but may have independent assist current circuits. In this case, different assist currents can be applied to AST1 and AST2. Therefore, the two assist elements can each provide a different assist effect.

The assist element AST is, for example, a thermal assist element for executing thermally assisted magnetic recording. Examples of the thermal assist element include a light-generating element (for example, a laser diode), a waveguide, and a near-field irradiation element (for example, a plasmon generator or a near-field transducer). The light-generating element is a light source (laser light source) and is disposed in an upper portion of the slider of the head 15 or in a gimbal. The light-generating element supplies light to the waveguide when an assist current or an assist voltage is applied thereto from the head amplifier IC 30. The light-generating element may be disposed in a place other than the slider of the head 15 or the gimbal. For example, the light-generating element may be disposed outside the arm 13 and the head 15. The waveguide causes the light generated from the light generating element to propagate to the near-field irradiation element. The near-field irradiation element is disposed at a lower end portion of the slider of the head 15 facing the disk 10. When data is written to the disk 10, the near-field irradiation element generates near-field light from the laser light that is propagated through the waveguide and irradiates the disk 10 with the near-field light. The near-field light with which the disk 10 is irradiated heats the recording layer of the disk 10 such that the coercive force of the recording layer of the disk 10 is reduced. The near-field irradiation element includes a metal member. In some embodiments, instead of the near-field irradiation element, a lens that focuses the light propagated from the light-generating element on the disk 10 may be disposed at the lower end portion of the slider of the head 15 facing the disk 10. Thus, by irradiating the disk 10 with the near-field light generated from the near-field irradiation element, the magnetic disk device 1 can execute high-density magnetic recording on the disk 10, which is a medium having a high coercive force.

In this example, when there are multiple thermal assist elements, for example, the thermal assist element AST1 and the thermal assist element AST2, each of the multiple thermal assist elements may include different light generating elements and different waveguides. In this case, each respective thermal assist elements can provide different assist effects.

Returning to FIG. 1, the driver IC 20 controls the driving of the SPM 12 and the VCM 14 in accordance with the control of the system controller 130 (specifically, an MPU 60 described below).

The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 50 described below). The write driver supplies a recording current to the head 15, the recording current corresponding to write data output from the R/W channel 50. For example, the write driver supplies a recording current to the recording coil in accordance with the control of the system controller 130 (specifically, the MPU 60 described below). The write driver may be electrically connected to each of the assist elements AST such that a predetermined assist current or assist voltage is applied to each of the assist elements AST in accordance with the control of the system controller 130 (the MPU 60).

The volatile memory 70 is a semiconductor memory in which stored data is lost when power supply is disconnected. The volatile memory 70 stores data or the like required for a process in each of the units of the magnetic disk device 1.

The volatile memory 70 is, for example, a dynamic random access memory (DRAM) or a synchronous dynamic random access memory (SDRAM).

The nonvolatile memory 80 is a semiconductor memory in which recorded data is stored even when power supply is disconnected. The nonvolatile memory 80 is, for example, a NOR or NAND flash memory ROM (Flash Read Only Memory: FROM).

The buffer memory 90 is a semiconductor memory in which data or the like transferred between the magnetic disk device 1 and the host 100 is temporarily recorded. The buffer memory 90 may be integrated with the volatile memory 70. The buffer memory 90 is, for example, DRAM, static random access memory (SRAM), SDRAM, ferroelectric random access memory (FeRAM), or magnetoresistive random access memory (MRAM).

The system controller (controller) 130 is implemented by a large-scale integrated circuit (LSI) called a System-on-a-Chip (SoC) in which a plurality of elements are integrated into a single chip. The system controller 130 includes a hard disk controller (HDC) 40, the read/write (R/W) channel 50, and the microprocessor (MPU) 60. The HDC 40, the R/W channel 50, and the MPU 60 are electrically connected to each other. For example, the system controller 130 is electrically connected to the driver IC 20, the head amplifier IC 30, the volatile memory 70, the nonvolatile memory 80, the buffer memory 90, and the host system 100.

The HDC 40 controls data transfer between the host 100 and the R/W channel 50 in accordance with an instruction from the MPU 60 described below. For example, the HDC 40 is electrically connected to the volatile memory 70, the nonvolatile memory 80, and the buffer memory 90.

The R/W channel 50 executes signal processing of read data and write data in accordance with an instruction from the MPU 60. For example, the R/W channel 50 is electrically connected to the head amplifier IC 30 and the like. The R/W channel 50 includes a circuit or a function that modulates write data. In addition, the R/W channel 50 includes a circuit or a function that measures the signal quality of read data.

The MPU 60 is a main controller that controls each of the units of the magnetic disk device 1. The MPU 60 controls the VCM 14 through the driver IC 20 such that the head 15 is positioned. The MPU 60 controls an operation of writing data to the disk 10 and selects a destination where write data transferred from the host 100 is stored. In addition, the MPU 60 controls an operation of reading data from the disk 10 and controls processing of read data transferred from the disk 10 to the host 100. The MPU 60 is connected to each of the units of the magnetic disk device 1. For example, the MPU 60 is electrically connected to the driver IC 20, the HDC 40, and the R/W channel 50.

The MPU 60 includes a read/write controller 610 and an assist element controller 620. The MPU 60 executes a process in each of the units, for example, the read/write controller 610 and the assist element controller 620 in firmware. The MPU 60 may include each of the units, for example, the read/write controller 610 and the assist element controller 620 as a circuit.

The read/write controller 610 controls a read operation and a write operation of data in accordance with a command from the host 100. The read/write controller 610 controls the VCM 14 through the driver IC 20 such that the head 15 is positioned at a predetermined position of the disk 10 and data is read or written. The read/write controller 610 can overwrite, with new data, data that is previously written in the radial direction. For example, when a radial servo pattern (a product servo pattern or a final servo pattern) is written to the disk 10 by self servo writing (SSW), the read/write controller 610 overwrites, in the radial direction, new servo data over servo data that is previously written. In addition, for example, when user data is written to the disk 10, the read/write controller 610 executes a process (Shingled write Magnetic Recording (SMR) or Shingled Write Recording (SWR)) in which writing the next track to be written overwrites, in the radial direction, a part of a track that is previously written. Hereinafter, a direction in which data is overwritten in the radial direction over a portion of data that is previously written will also be referred to as the "overwrite direction". The read/write controller 610 can also write data at a predetermined interval from data that is previously written in the radial direction. The operation of writing data at a predetermined interval from data that is previously written in the radial direction will also be referred to as "typical recording" or "typical writing". For example, the read/write controller 610 typically records one spiral servo pattern from an inner circumference to an outer circumference of the disk 10. In addition, when user data is written to the disk 10, the read/write controller 610 typically records another track at an interval from a predetermined track in the radial direction.

The assist element controller 620 controls the assist energy to be generated and applied from each of the assist elements AST to the disk 10. For example, the assist element controller 620 controls the assist current or the assist voltage to be applied to each of the assist elements AST such that the assist energy to be generated and applied from each of the assist elements AST to the disk 10 is controlled. For example, the assist element controller 620 applies different assist currents or different assist voltages to the respective assist elements AST such that different assist energies can be generated and applied from the respective assist elements AST to the disk 10. When the characteristics of the respective assist elements AST are different from each other, the assist element controller 620 applies the same assist current or the same assist voltage to the respective assist elements AST such that different assist energies can be generated and applied from the respective assist elements AST to the disk 10. Here, "the same", "identical", "match", "equal", and the like refer to not only "exactly the same" but also "different but substantially the same". In addition, the assist element controller 620 applies the same assist current or the same assist voltage to the respective assist elements AST such that the same assist energy can be generated and applied from the respective assist elements AST to the disk 10. For example, when one spiral servo pattern is written from the inner circumference to the outer circumference of the disk 10, the assist element controller 620 applies the same assist current or the same assist voltage to the respective assist elements AST such that same assist energy can be generated and applied from the respective assist elements AST to the disk 10.

The assist element controller 620 controls the assist energy to be generated and applied from a plurality of assist elements to the disk 10 depending on the overwrite direction. In other words, the assist element controller 620 controls the assist energy to be generated and applied from a plurality of assist elements to the disk 10 depending on the overwrite direction such that data to be written to the disk 10 is controlled.

For example, when data is overwritten in the outer direction, the assist element controller 620 sets the assist energy that is generated and applied from the assist energy AST1 to the disk 10 to be lower than the assist energy that is generated and applied from the assist element AST2 to the disk 10. In other words, when data is overwritten in the outer direction, the assist element controller 620 sets the assist energy that is generated and applied from the assist element AST2 to the disk 10 to be higher than the assist energy that is generated and applied from the assist energy AST1 to the disk 10. For example, when data is overwritten in the outer direction, the assist element controller 620 sets the assist current or the assist voltage that is applied to the assist element AST1 to be lower than the assist current or the assist voltage that is applied to the assist element AST2. In other words, when data is overwritten in the outer direction, the assist element controller 620 sets the assist current or the assist voltage that is applied to the assist element AST2 to be higher than the assist current or the assist voltage that is applied to the assist element AST1.

For example, when data is overwritten in the outer direction, the assist element controller 620 sets the assist energy that is generated and applied from the assist energy AST1 to the disk 10 to be lower than the assist energy that is generated and applied from the assist element AST2 to the disk 10. As a result, the size (or the width) in the radial direction of data (hereinafter, also referred to as "fringe data") that is generated in the inner direction of data written in the write head 15W and is affected by leakage (hereinafter, referred to as "fringing", "fringe", or "side fringe") of a recording magnetic field from the write head 15W is set to be lower than the size in the radial direction of fringe data that is generated in the outer direction of the data written in the write head 15W. For example, the fringe data corresponds to a portion (data) in which magnetization is continuously weakened in the data written in the write head 15W.

In another example, when data is overwritten in the inner direction, the assist element controller 620 sets the assist energy that is generated and applied from the assist energy AST2 to the disk 10 to be lower than the assist energy that is generated and applied from the assist element AST1 to the disk 10. In other words, when data is overwritten in the inner direction, the assist element controller 620 sets the assist energy that is generated and applied from the assist element AST1 to the disk 10 to be higher than the assist energy that is generated and applied from the assist energy AST2 to the disk 10. For example, when data is overwritten in the inner direction, the assist element controller 620 sets the assist current or the assist voltage that is applied to the assist element AST2 to be lower than the assist current or the assist voltage that is applied to the assist element AST1. In other words, when data is overwritten in the inner direction, the assist element controller 620 sets the assist current or the assist voltage that is applied to the assist element AST1 to be higher than the assist current or the assist voltage that is applied to the assist element AST2.

In such an example, i.e., when data is overwritten in the inner direction, the assist element controller 620 sets the assist energy that is generated and applied from the assist energy AST2 to the disk 10 to be lower than the assist energy that is generated and applied from the assist element AST1 to the disk 10. As a result, the size in the radial direction of fringe data that is generated in the outer direction of the data written in the write head 15W is set to be lower than the size in the radial direction of fringe data that is generated in the inner direction of the data written in the write head 15W.

Depending on certain conditions, such as a skew angle, one or more characteristics of the disk 10, one or more characteristics of the head 15, a recording frequency, and a track pitch (hereinafter, also referred to as "various conditions"), the assist element controller 620 sets the size of the assist energy to be generated and applied from each of the assist elements AST to the disk 10. In other words, the assist element controller 620 sets the assist current or the assist voltage to be applied to each of the assist element AST based at least in part on one or more of the above-described various conditions. For example, the assist element controller 620 sets the position or the size in the radial direction of the fringe data of the data written in the write head 15W to vary based in part on the various conditions. For example, the assist element controller 620 sets the position or the size in the radial direction of the fringe data of the data written in the write head 15W to vary depending on the skew angle (opposite radial position). Based on the various conditions, the assist element controller 620 may record the size of the assist energy to be generated and applied from each of the assist elements AST to the disk 10 in a predetermined recording region, for example, the system area 10b of the disk 10, the volatile memory 70, or the nonvolatile memory 80 as a table.

Hereinafter, each of the assist energies generated from the assist elements AST in the overwrite direction will be described with reference to FIGS. 4 to 10.

Figure 4:
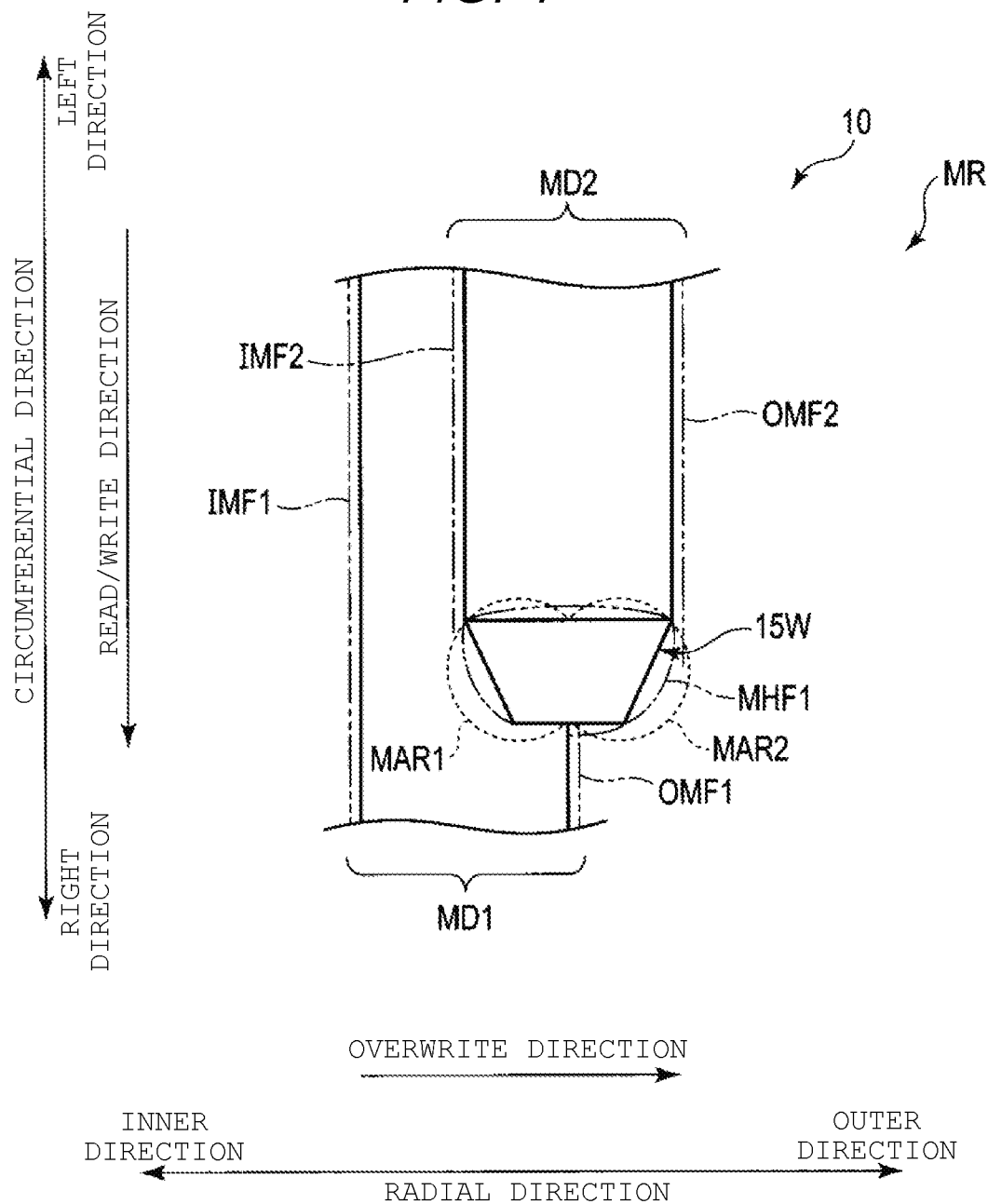
FIG. 4 is a schematic diagram illustrating an example of assist energies of a plurality of assist elements when overwriting is executed in an intermediate circumferential region in an outer direction.

FIG. 4 is a schematic diagram illustrating an example of the assist energies of the assist elements AST when overwriting is executed in the intermediate circumferential region MR in the outer direction. FIG. 4 illustrates data MD1 that extends in the circumferential direction and data MD2 that extends in the circumferential direction and is adjacent to the data MD1 in the outer direction. The data MD2 is overwritten over a portion of the data MD1 in the outer direction, where, in FIG. 4, the overwrite direction is the outer direction. The data MD1 and MD2 may be servo data or may be user data (such as a data track). The data MD1 includes fringe data IMF1 and OMF1. The fringe data IMF1 is positioned at an edge portion of the data MD1 in the inner direction, and the fringe data OMF1 is positioned at an edge portion of the data MD1 in the outer direction. The data MD2 includes fringe data IMF2 and OMF2. The fringe data IMF2 is positioned at an edge portion of the data MD2 in the inner direction, and the fringe data OMF2 is positioned at an edge portion of the data MD2 in the outer direction. For example, a solid line portion of the write head 15W illustrated in FIG. 4 corresponds to a portion of the write head 15W illustrated in FIG. 3 where a recording magnetic field is actually generated and applied to the disk 10. FIG. 4 illustrates a fringe MHF1 from the write head 15W. In addition, FIG. 4 illustrates a range (hereinafter, also referred to as "assist range") MAR1 that is affected by the assist energy generated from the assist element AST1 and an assist range MAR2 of the assist element AST2.

In an example illustrated in FIG. 4, the MPU 60 writes the data MD1 and MD2 to the disk 10 in the intermediate circumferential region MR at a skew angle of 0°. The MPU 60 generates the same assist energy from the assist elements AST1 and AST2 and overwrites the data MD2 in the outer direction of the data MD1. For example, the MPU 60 applies the same assist current or the same assist voltage to the assist elements AST1 and AST2 such that the data MD2 overwrites a portion of data MD1 in the outer direction. For example, when the size of the assist energy of the assist element AST1 is 1, the MPU 60 sets the size of the assist energy of the assist element AST2 as 1, such that the data MD2 overwrites a portion of the data MD 1 in the outer direction of the data MD1 as shown in FIG. 4. For example, the MPU 60 applies the assist current or the assist voltage so that the assist energy of the assist element AST1 has a size of 1 and applies the assist current or the assist voltage so that the assist energy of the assist element AST2 has a size of 1. Thus, the data MD2 is overwritten in the outer direction of the data MD1 as shown in FIG. 4. In some embodiments, the MPU 60 sets the size of the assist energy to be generated and applied from each of the assist elements AST1 and AST2 to the disk 10 further based on the various conditions. For example, the MPU 60 sets the assist current or the assist voltage to be applied to each of the assist elements AST1 and AST2 based on the various conditions. In the example illustrated in FIG. 4, the fringe data IMF1 and OMF1, which have predetermined sizes in the radial direction, are generated in the radial direction of the data MD1 by the fringe MHF1 of the write head 15W. In addition, the fringe data IMF2 and OMF2, which have predetermined sizes in the radial direction, are generated in the radial direction of the data MD2 by the fringe MHF1 of the write head 15W.

Figure 5:
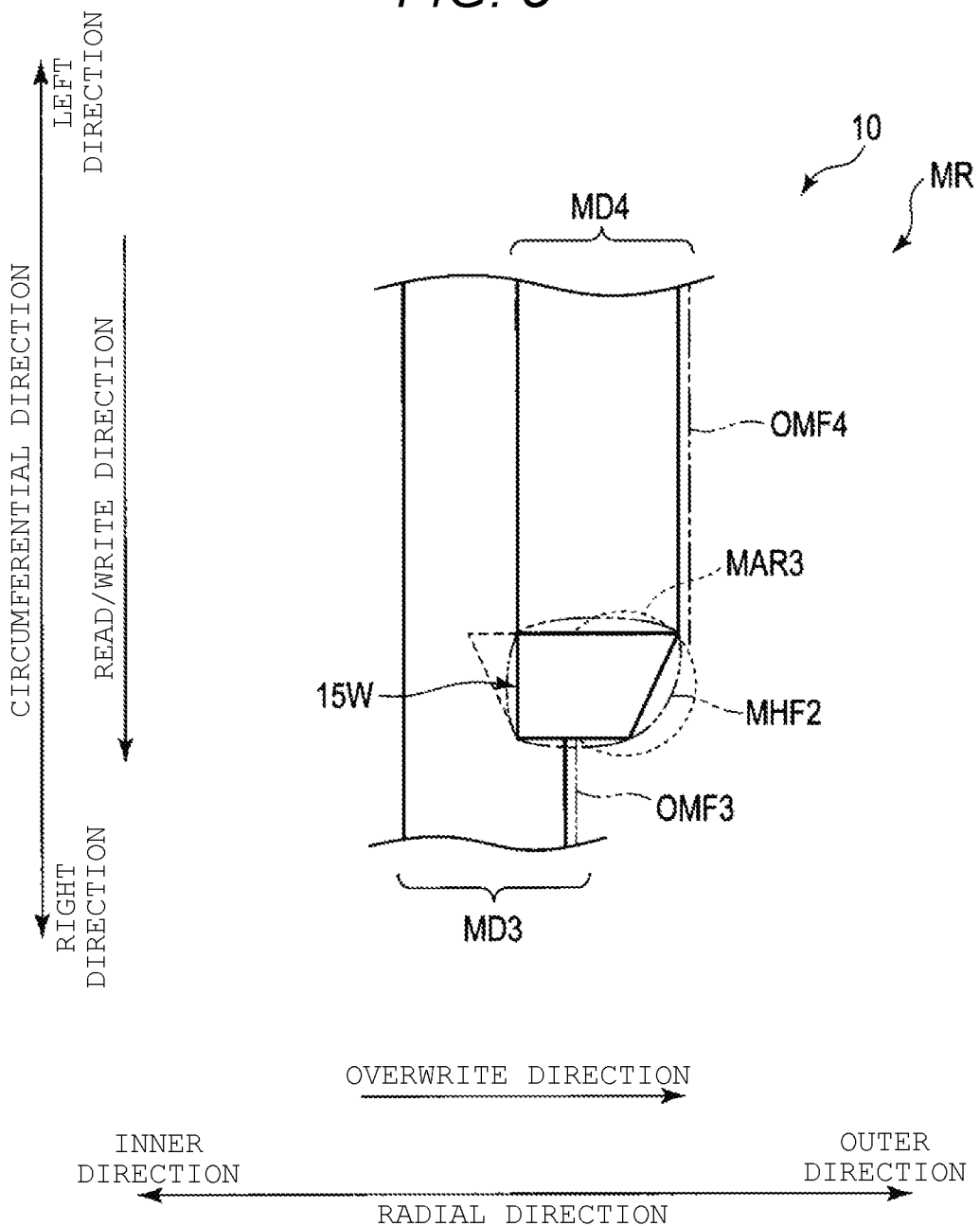
FIG. 5 is a schematic diagram illustrating an example of the assist energies of the assist elements when overwriting is executed in the intermediate circumferential region in the outer direction.

FIG. 5 is a schematic diagram illustrating an example of the assist energies of the assist elements AST when overwriting is executed in the intermediate circumferential region MR in the outer direction. FIG. 5 illustrates data MD3 that extends in the circumferential direction and data MD4 that extends in the circumferential direction and is adjacent to the data MD3 in the outer direction. The data MD4 is overwritten over a portion of the data MD3 in the outer direction. That is, in FIG. 5, the overwrite direction is the outer direction. The data MD3 and MD4 may be servo data or may be user data (such as a data track). The data MD3 includes fringe data OMF3. The fringe data OMF3 is positioned at an edge portion of the data MD3 in the outer direction. The data MD4 includes fringe data OMF4. The fringe data OMF4 is positioned at an edge portion of the data MD4 in the outer direction. For example, a solid line portion of the write head 15W illustrated in FIG. 5 corresponds to a portion of the write head 15W illustrated in FIG. 3 where a recording magnetic field is generated that is effective for the disk 10. Further, a broken line portion of the write head 15W illustrated in FIG. 5 corresponds to a portion of the write head 15W illustrated in FIG. 3 where a recording magnetic field is generated that is not effective for the disk 10. FIG. 5 illustrates a fringe MHF2 from the write head 15W. In addition, FIG. 5 illustrates an assist range MAR3 of the assist element AST2.

In an example illustrated in FIG. 5, the MPU 60 overwrites the data MD3 and MD4 to the disk 10 in the intermediate circumferential region MR at a skew angle of 0°. The MPU 60 sets the assist energy that is generated from the assist element AST1 to be lower than the assist energy that is generated from the assist element AST2 such that the data MD4 overwrites a portion of the data MD3 in the outer direction as shown in FIG. 5. For example, the MPU 60 sets the assist current or the assist voltage that is applied to the assist element AST1 (which in this case is the trailing edge assist element of the write head 15W) to be lower than the assist current or the assist voltage that is applied to the assist element AST2 (which in this case is the leading edge assist element of the write head 15W). The trailing edge assist element of the write head 15W is the assist element disposed on a side of the write head 15W that faces away from the overwrite direction, and the leading edge assist element of the write head 15W is the assist element disposed on a side of the write head 15W that faces toward the overwrite direction. As a result, the data MD4 overwrites a portion of the data MD3 in the outer direction as shown. For example, when the size of the assist energy of the assist element AST1 is 1, the MPU 60 sets the size of the assist energy of the assist element AST2 as 9, so that the data MD4 overwrites a portion of the data MD3 in the outer direction as shown.

In such an example, the MPU 60 applies the assist current or the assist voltage having a size of 1 to the assist element AST1 and applies the assist current or the assist voltage having a size of 9 to the assist element AST2. As noted previously, in some embodiments, the MPU 60 sets the size of the assist energy to be generated and applied from each of the assist elements AST1 and AST2 to the disk 10 based at least in part on the various conditions. Thus, the MPU 60 sets the assist current or the assist voltage to be applied to each of the assist elements AST1 and AST2 depending on the various conditions. In addition, in some embodiments, the MPU 60 sets the size of the assist energy of the assist element AST1 as 0, such that the data MD4 overwrites a portion of the data MD3 in the outer direction as shown. In other words, the MPU 60 sets the assist element AST1 to OFF and sets the assist element AST2 to ON. In such an embodiment, the MPU 60 overwrites the portion of the data MD3 in the outer direction with data MD4 without applying the assist current or the assist voltage to the assist element AST1. In the example illustrated in FIG. 5, the fringe data OMF3 is generated in the data MD3 by the fringe MHF2 of the write head 15W. Since the fringe MHF2 in the inner direction of the write head 15W is small, fringe data is not generated in the inner direction of the data MD3. Similarly, the fringe data OMF4 having a predetermined size in the radial direction is generated in the outer direction of the data MD4 by the fringe MHF2 of the write head 15W. Since the fringe MHF2 in the inner direction of the write head 15W is small, fringe data is not generated in the inner direction of the data MD4. In the example illustrated in FIG. 5, fringe data having a smaller size in the radial direction than the size of the fringe data OMF4 in the radial direction may be generated. It is noted that the fringe data OMF3 is overwritten by the next data track that is written in the outer direction from the data MD3 (i.e., the data MD4) and the fringe data OMF4 are overwritten by the next data track that is written in the outer direction from the data MD4 (not shown). Accordingly, in the example illustrated in FIG. 5, the generation of fringe data in data can be reduced, and the quality of data can be improved.

Figure 6:
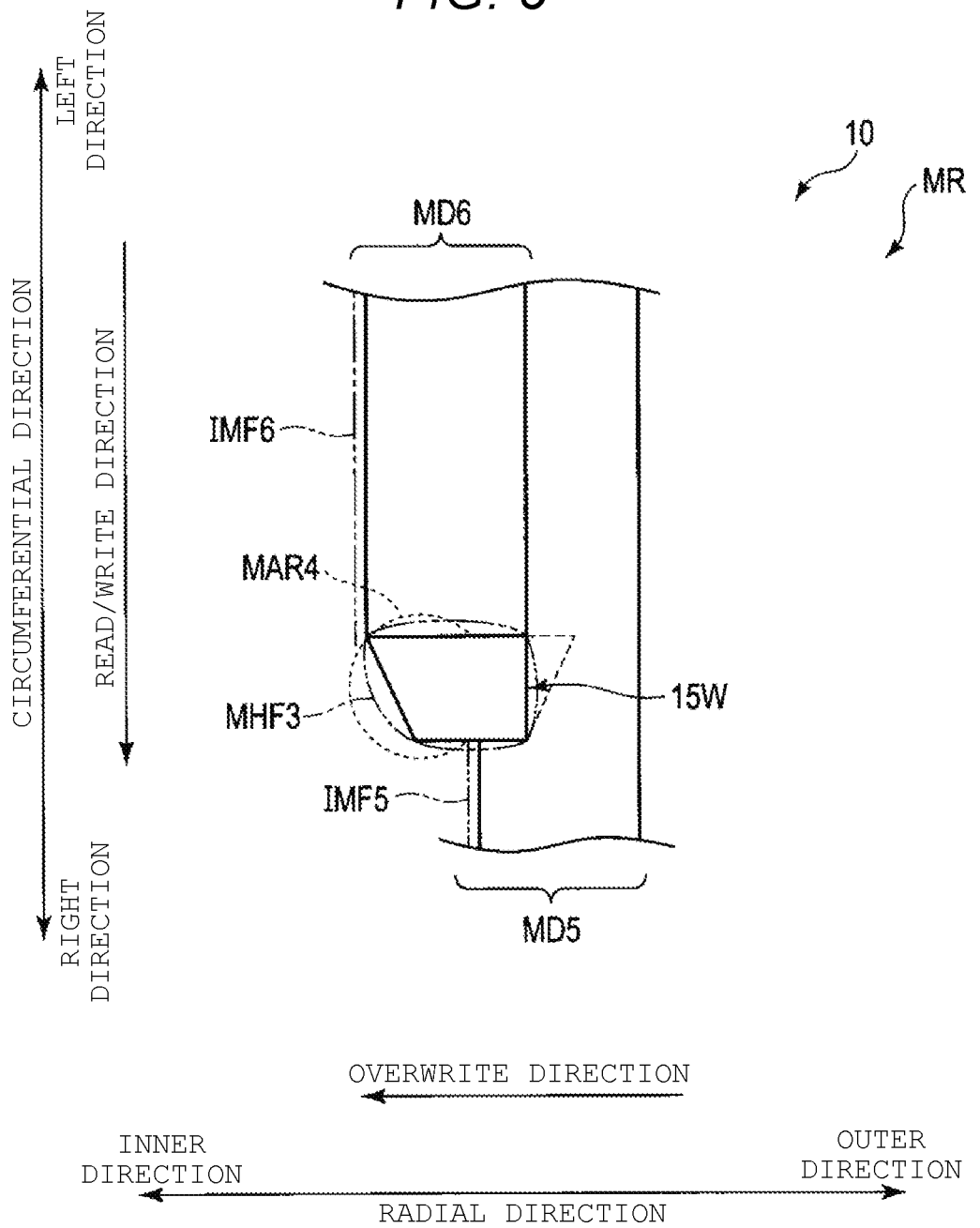
FIG. 6 is a schematic diagram illustrating an example of assist energies of the assist elements when overwriting is executed in the intermediate circumferential region in an inner direction.

FIG. 6 is a schematic diagram illustrating an example of the assist energies of the assist elements AST when overwriting is executed in the intermediate circumferential region MR in the inner direction. FIG. 6 illustrates data MD5 that extends in the circumferential direction and data MD6 that extends in the circumferential direction and is adjacent to the data MD5 in the inner direction. The data MD6 is overwritten in the inner direction over a portion of the data MD5. That is, in FIG. 6, the overwrite direction is the inner direction. The data MD5 and MD6 may be servo data or may be user data (such as a data track). The data MD5 includes fringe data IMF5. The fringe data IMF5 is positioned at an edge portion of the data MD5 in the inner direction. The data MD6 includes fringe data IMF6. The fringe data IMF6 is positioned at an edge portion of the data MD6 in the inner direction. For example, a solid line portion of the write head 15W illustrated in FIG. 6 corresponds to a portion of the write head 15W illustrated in FIG. 3 where a recording magnetic field is actually generated and applied to the disk 10. For Further, a broken line portion of the write head 15W illustrated in FIG. 6 corresponds to a portion of the write head 15W illustrated in FIG. 3 where a recording magnetic field is generated that is not effective for the disk 10. FIG. 6 illustrates a fringe MHF3 from the write head 15W. In addition, FIG. 6 illustrates an assist range MAR4 of the assist element AST1.

In an example illustrated in FIG. 6, the MPU 60 overwrites the data MD5 and MD6 to the disk 10 in the intermediate circumferential region MR at a skew angle of 0°. The MPU 60 sets the assist energy that is generated from the assist element AST2 to be lower than the assist energy that is generated from the assist element AST1 such that the data MD6 overwrites in the inner direction a portion of the data MD5 as shown. For example, the MPU 60 sets the assist current or the assist voltage that is applied to the assist element AST2 to be lower than the assist current or the assist voltage that is applied to the assist element AST1. Thus, the data MD6 overwrites in the inner direction a portion of the data MD5 as shown. For example, in an embodiment, when the size of the assist energy of the assist element AST2 is 1, the MPU 60 may set the size of the assist energy of the assist element AST1 as 9, so that the data MD6 overwrites in the outer direction a portion of the data MD5 as shown. In the embodiment, the MPU 60 applies the assist current or the assist voltage having a size of 1 to the assist element AST2 and applies the assist current or the assist voltage having a size of 9 to the assist element AST1.

In some embodiments, the MPU 60 sets the size of the assist energy to be generated and applied from each of the assist elements AST1 and AST2 to the disk 10 depending on the various conditions. For example, in an embodiment, the MPU 60 sets the assist current or the assist voltage to be applied to each of the assist elements AST1 and AST2 depending on the various conditions. In another embodiment, the MPU 60 sets the size of the assist energy of the assist element AST2 as 0 such that the data MD6 overwrites in the inner direction a portion of the data MD5 as shown. In other words, in the embodiment, the MPU 60 sets the assist element AST2 to OFF and sets the assist element AST1 to ON, such that the data MD6 overwrites in the inner direction a portion of the data MD5 as shown. Thus, in such an embodiment, the MPU 60 overwrites in the outer direction a portion of the data MD5 without applying the assist current or the assist voltage to the assist element AST2.

In the example illustrated in FIG. 6, the fringe data IMF3 is generated in the data MD5 by the fringe MHF3 of the write head 15W. Since the fringe MHF3 in the outer direction of the write head 15W is small, fringe data is not generated in the outer direction of the data MD5. Similarly, the fringe data IMF6 having a predetermined size in the radial direction is generated in the inner direction of the data MD6 by the fringe MHF3 of the write head 15W. Since the fringe MHF3 in the outer direction of the write head 15W is small, fringe data is not generated in the outer direction of the data MD6. In the example illustrated in FIG. 6, fringe data having a smaller size in the radial direction than the size of the fringe data IMF4 in the radial direction may be generated. It is noted that the fringe data IMF5 is overwritten by the next data track that is written in the inner direction from the data MD5 (i.e., the data MD6) and the fringe data IMF6 is overwritten by the next data track that is written in the inner direction from the data MD6 (not shown). Accordingly, in the example illustrated in FIG. 6, the generation of fringe data in data can be reduced, and the quality of data can be improved.

Figure 7:
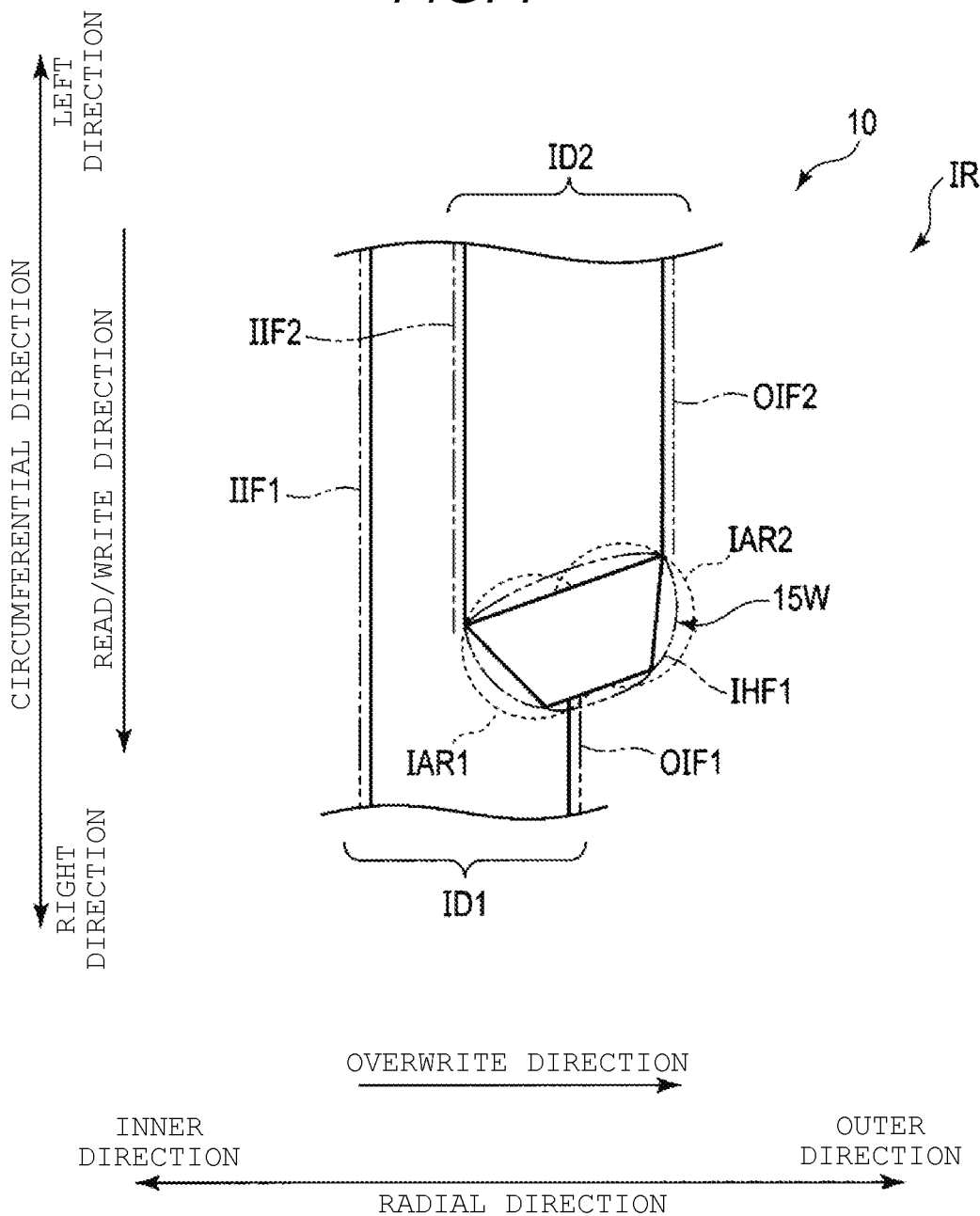
FIG. 7 is a schematic diagram illustrating an example of assist energies of the assist elements when overwriting is executed in an inner circumferential region in the outer direction.

FIG. 7 is a schematic diagram illustrating an example of the assist energies of the assist elements AST when overwriting is executed in the inner circumferential region IR in the outer direction. FIG. 7 illustrates data ID1 that extends in the circumferential direction and data ID2 that extends in the circumferential direction and is adjacent to the data ID1 in the outer direction. The data ID2 is overwritten to a part of the data ID1 in the outer direction. That is, in FIG. 7, the overwrite direction is the outer direction. The data ID1 and ID2 may be servo data or may be user data (such as a data track). The data ID1 includes fringe data IIF1 and OIF1. The fringe data IIF1 is positioned at an edge portion of the data ID1 in the inner direction, and the fringe data OIF1 is positioned at an edge portion of the data ID1 in the outer direction. The data ID2 includes fringe data IIF2 and OIF2. The fringe data IIF2 is positioned at an edge portion of the data ID2 in the inner direction, and the fringe data OIF2 is positioned at an edge portion of the data ID2 in the outer direction. For example, a solid line portion of the write head 15W illustrated in FIG. 7 corresponds to a portion of the write head 15W illustrated in FIG. 3 where a recording magnetic field that is effective for the disk 10 is generated. FIG. 7 illustrates a fringe IHF1 from the write head 15W. In addition, FIG. 7 illustrates an assist range IAR1 of the assist element AST1 and an assist range IAR2 of the assist element AST2.

In an example illustrated in FIG. 7, the write head 15W is inclined at a predetermined skew angle in the inner direction in the inner circumferential region IR and writes the data ID1 and ID2 to the disk 10. The MPU 60 generates the same assist energy from the assist elements AST1 and AST2 and overwrites the data ID2 in the outer direction of the data ID1. For example, the MPU 60 applies the same assist current or the same assist voltage to the assist elements AST1 and AST2 such that the data ID2 overwrites in the outer direction a portion of the data ID1 as shown in FIG. 7. For example, when the size of the assist energy of the assist element AST1 is 1, the MPU 60 sets the size of the assist energy of the assist element AST2 as 1. Consequently, the data ID2 overwrites in the outer direction a portion of the data ID1 as shown. Thus, the MPU 60 applies the assist current or the assist voltage having a size of 1 to the assist element AST1 and applies the assist current or the assist voltage having a size of 1 to the assist element AST2 such that the data ID2 is overwritten in the outer direction of the data ID1. In some embodiments, the MPU 60 further sets the size of the assist energy to be generated and applied from each of the assist elements AST1 and AST2 to the disk 10 based at least in part on the various conditions. For example, in an embodiment, the MPU 60 sets the assist current or the assist voltage to be applied to each of the assist elements AST1 and AST2 based on the various conditions. In the example illustrated in FIG. 7, the fringe data IIF1 and OIF1, which have predetermined sizes in the radial direction, are generated in the radial direction of the data ID1 by the fringe IHF1 of the write head 15W. In addition, the fringe data IIF2 and OIF2, which have predetermined sizes in the radial direction, are generated in the radial direction of the data ID2 by the fringe IHF1 of the write head 15W.

Figure 8:
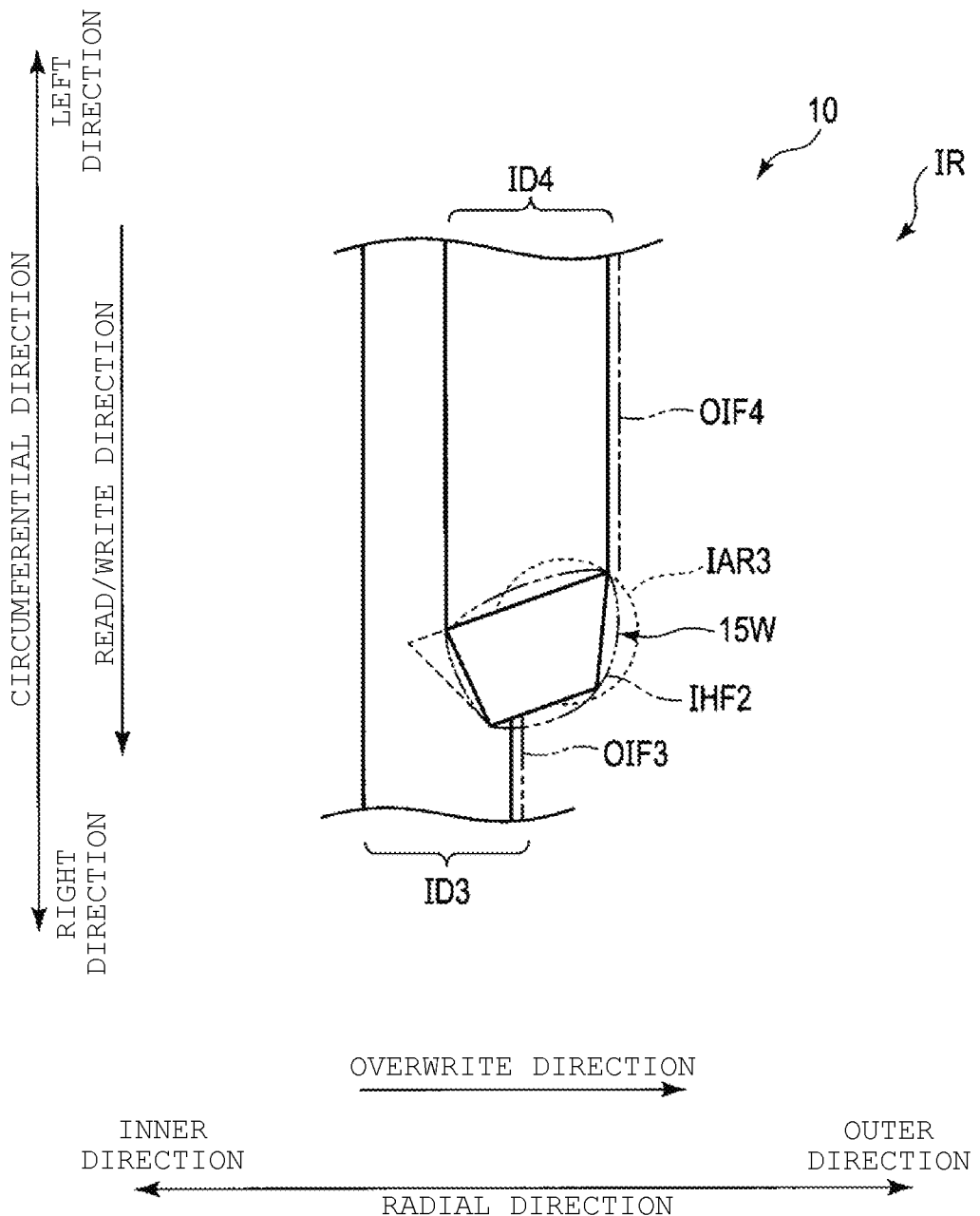
FIG. 8 is a schematic diagram illustrating an example of assist energies of the assist elements when overwriting is executed in the inner circumferential region in the outer direction.

FIG. 8 is a schematic diagram illustrating an example of the assist energies of the assist elements AST when overwriting is executed in the inner circumferential region IR in the outer direction. FIG. 8 illustrates data ID3 that extends in the circumferential direction and data ID4 that extends in the circumferential direction and is adjacent to the data ID3 in the outer direction. The data ID4 overwrites in the outer direction a portion of the data ID3. That is, in FIG. 8, the overwrite direction is the outer direction. The data ID3 and ID4 may be servo data or may be user data (such as a data track). The data ID3 includes fringe data OIF3. The fringe data OIF3 is positioned at an edge portion of the data ID3 in the outer direction. The data ID4 includes fringe data OIF4. The fringe data OIF4 is positioned at an edge portion of the data ID4 in the outer direction. For example, a solid line portion of the write head 15W illustrated in FIG. 8 corresponds to a portion of the write head 15W illustrated in FIG. 3 where a recording magnetic field that is effective for the disk 10 is generated. For example, a broken line portion of the write head 15W illustrated in FIG. 8 corresponds to a portion of the write head 15W illustrated in FIG. 3 where a recording magnetic field that is not effective for the disk 10 is generated. FIG. 8 illustrates a fringe IHF2 from the write head 15W. In addition, FIG. 8 illustrates an assist range IAR3 of the assist element AST2.

In an example illustrated in FIG. 8, the write head 15W is inclined at a predetermined skew angle in the inner direction in the inner circumferential region IR and writes the data ID3 and ID4 to the disk 10. In the embodiment illustrated, the MPU 60 sets the assist energy that is generated from the assist element AST1 to be lower than the assist energy that is generated from the assist element AST2, such that the data ID4 overwrites a portion of the data ID3 in the outer direction as shown. Thus, in the embodiment, the MPU 60 sets the assist current or the assist voltage that is applied to the assist element AST1 to be lower than the assist current or the assist voltage that is applied to the assist element AST2, so that the data ID4 overwrites a portion of the data ID3 in the outer direction. For example, when the size of the assist energy of the assist element AST1 is 1, the MPU 60 sets the size of the assist energy of the assist element AST2 as 9, so that the data ID4 overwrites in the outer direction a portion of the data ID3. In the example, the MPU 60 applies the assist current or the assist voltage having a size of 1 to the assist element AST1 and applies the assist current or the assist voltage having a size of 9 to the assist element AST2 such that the data ID4 overwrites in the outer direction a portion of the data ID3.

In some embodiment, the MPU 60 further sets the size of the assist energy to be generated and applied from each of the assist elements AST1 and AST2 to the disk 10 depending on the various conditions. For example, in one such embodiment, the MPU 60 sets the assist current or the assist voltage to be applied to each of the assist elements AST1 and AST2 based at least in part on the various conditions. In addition, in the embodiment, the MPU 60 sets the size of the assist energy of the assist element AST1 as 0 such that the data ID4 overwrites in the outer direction a portion of the data ID3. In other words, the MPU 60 sets the assist element AST1 to OFF and sets the assist element AST2 to ON, so that the data ID4 overwrites in the outer direction a portion of the data ID3 as shown. Thus, in an embodiment, the MPU 60 overwrites the data ID4 in the outer direction of the data ID3 without applying the assist current or the assist voltage to the assist element AST1.

In the example illustrated in FIG. 8, the fringe data OIF3 is generated in the data ID3 by the fringe IHF2 of the write head 15W. By contrast, since the fringe IHF2 in the inner direction of the write head 15W is small, fringe data is not generated in the inner direction of the data ID3. Similarly, the fringe data OIF4, which has a predetermined size in the radial direction, is generated in the outer direction of the data ID4 by the fringe IHF2 of the write head 15W. Since the fringe IHF2 in the inner direction of the write head 15W is small, fringe data is not generated in the inner direction of the data ID4. In the example illustrated in FIG. 8, fringe data having a smaller size in the radial direction than the size of the fringe data OIF4 in the radial direction may be generated. It is noted that the fringe data OIF3 is overwritten by the next data track that is written in the outer direction from the data MD5 (i.e., the data ID4) and OIF4 is overwritten by the next data track that is written in the outer direction from the data MD4 (not shown). Accordingly, in the example illustrated in FIG. 8, the generation of fringe data in data can be reduced, and the quality of data can be improved.

In the example illustrated in FIG. 8, the write head 15W is inclined at a predetermined skew angle in the inner direction in the inner circumferential region IR and overwrites the data ID4 over a portion of the data ID3 in the outer direction. The write head 15W may be inclined at a predetermined skew angle in the inner direction in the inner circumferential region IR and may overwrite the data ID4 over a portion of the data ID3 in the inner direction. In this case, the MPU 60 sets the assist current or the assist voltage that is applied to the assist element AST2 to be lower than the assist current or the assist voltage that is applied to the assist element AST1, so that the data ID4 overwrites in the outer direction a portion of the data ID3.

Figure 9:
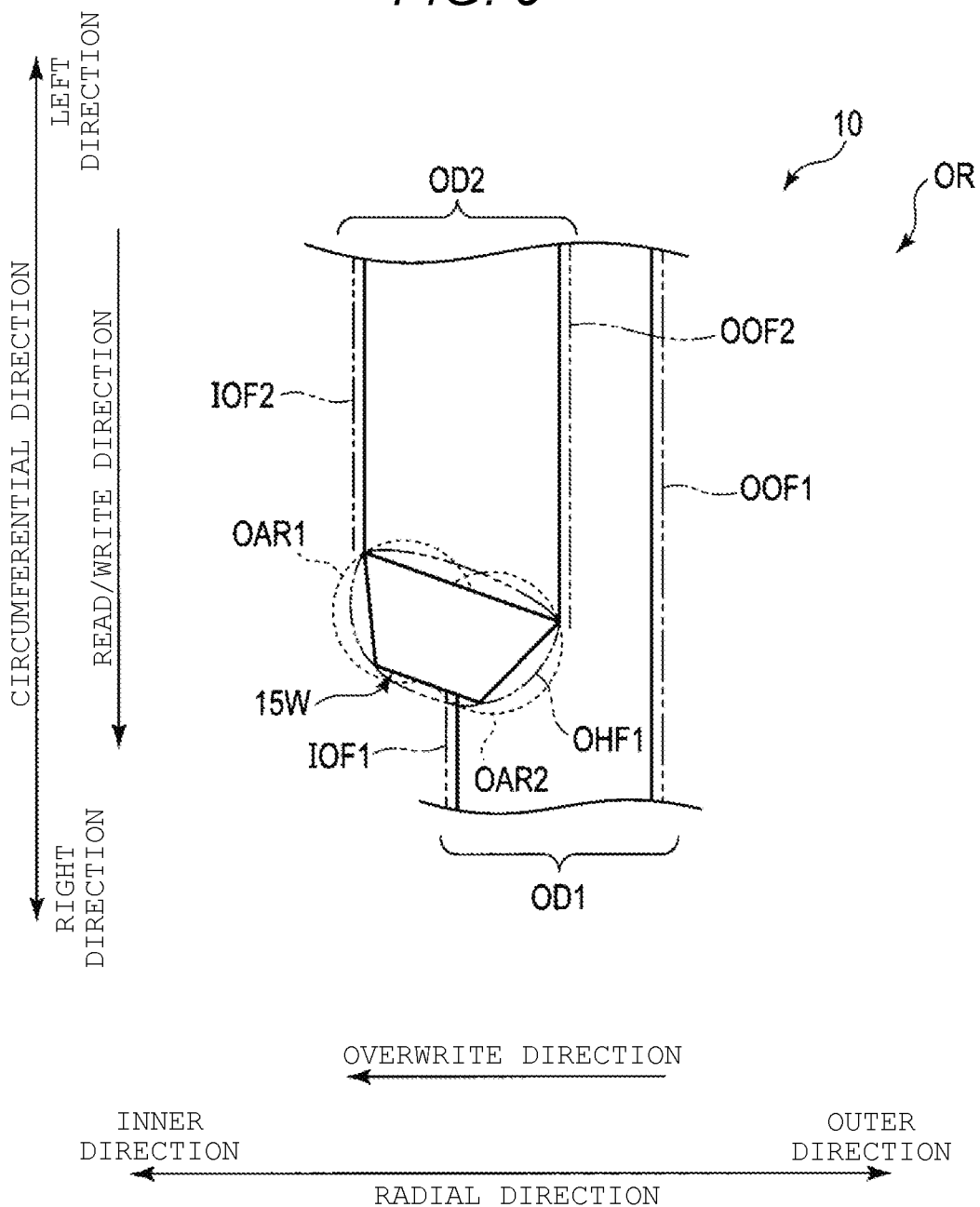
FIG. 9 is a schematic diagram illustrating an example of assist energies of the assist elements when overwriting is executed in an outer circumferential region in the inner direction.

FIG. 9 is a schematic diagram illustrating an example of the assist energies of the assist elements AST when overwriting is executed in the outer circumferential region OR in the inner direction. FIG. 9 illustrates data OD1 that extends in the circumferential direction and data OD2 that extends in the circumferential direction and is adjacent to the data OD1 in the inner direction. The data OD2 overwrites a portion of the data OD1 in the outer direction. That is, in FIG. 9, the overwrite direction is the inner direction. The data OD1 and OD2 may be servo data or may be user data (such as a data track). The data OD1 includes fringe data IOF1 and OOF1. The fringe data IOF1 is positioned at an edge portion of the data OD1 in the inner direction, and the fringe data OOF1 is positioned at an edge portion of the data OD1 in the outer direction. The data OD2 includes fringe data IOF2 and OOF2. The fringe data IOF2 is positioned at an edge portion of the data OD2 in the inner direction, and the fringe data OOF2 is positioned at an edge portion of the data OD2 in the outer direction. For example, a solid line portion of the write head 15W illustrated in FIG. 9 corresponds to a portion of the write head 15W illustrated in FIG. 3 where a recording magnetic field that is effective for the disk 10 is generated. FIG. 9 illustrates a fringe OHF1 from the write head 15W. In addition, FIG. 9 illustrates an assist range OAR1 of the assist element AST1 and an assist range OAR2 of the assist element AST2.

In an embodiment illustrated in FIG. 9, the write head 15W is inclined at a predetermined skew angle in the inner direction in the outer circumferential region OR and writes the data OD1 and OD2 to the disk 10. In the embodiment, the MPU 60 generates the same assist energy from the assist elements AST1 and AST2 and overwrites the data OD2 in the outer direction over a portion of the data OD1. Thus, the MPU 60 applies the same assist current or the same assist voltage to the assist elements AST1 and AST2 such that the data OD2 overwrites in the outer direction a portion of the data OD1 as shown in FIG. 9. For example, when the size of the assist energy of the assist element AST1 is 1, the MPU 60 sets the size of the assist energy of the assist element AST2 as 1. As a result, the data OD2 overwrites a portion of the data OD1 in the outer direction as shown. Thus, in the example, the MPU 60 applies the assist current or the assist voltage having a size of 1 to the assist element AST1 and applies the assist current or the assist voltage having a size of 1 to the assist element AST2. Additionally, in some embodiments, the MPU 60 further sets the size of the assist energy to be generated and applied from each of the assist elements AST1 and AST2 to the disk 10 based at least in part on the various conditions. For example, in such embodiments, the MPU 60 sets the assist current or the assist voltage to be applied to each of the assist elements AST1 and AST2 depending on the various conditions. In the example illustrated in FIG. 9, the fringe data IOF1 and OOF1, which have predetermined sizes in the radial direction, are generated in the radial direction of the data OD1 by the fringe OHF1 of the write head 15W. In addition, the fringe data IOF2 and OOF2, which have predetermined sizes in the radial direction, are generated in the radial direction of the data OD2 by the fringe OHF1 of the write head 15W.

Figure 10:
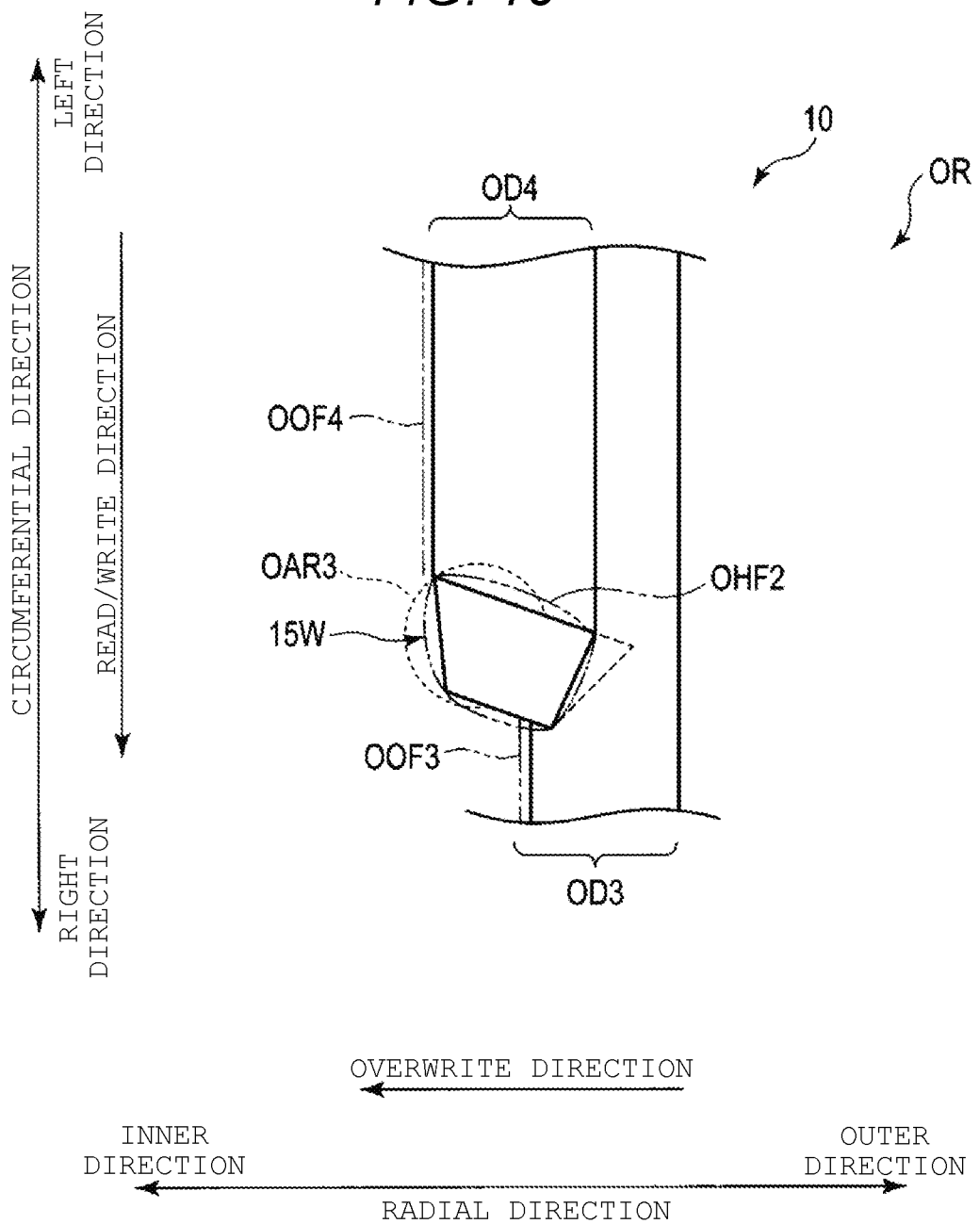
FIG. 10 is a schematic diagram illustrating an example of assist energies of the assist elements when overwriting is executed in the outer circumferential region in the outer direction.

FIG. 10 is a schematic diagram illustrating an example of the assist energies of the assist elements AST when overwriting is executed in the outer circumferential region OR in the outer direction. FIG. 10 illustrates data OD3 that extends in the circumferential direction and data OD4 that extends in the circumferential direction and is adjacent to the data OD3 in the outer direction. The data OD4 overwrites in the outer direction a portion of the data OD3. Thus, in FIG. 10, the overwrite direction is the inner direction. The data OD3 and OD4 may be servo data or may be user data (such as a data track). The data OD3 includes fringe data OOF3. The fringe data OOF3 is positioned at an edge portion of the data OD3 in the inner direction. Similarly, the data OD4 includes fringe data OOF4. The fringe data OOF4 is positioned at an edge portion of the data OD4 in the inner direction. A solid line portion of the write head 15W illustrated in FIG. 10 corresponds to a portion of the write head 15W illustrated in FIG. 3 where a recording magnetic field that is effective for the disk 10 is generated. Further, a broken line portion of the write head 15W illustrated in FIG. 10 corresponds to a portion of the write head 15W illustrated in FIG. 3 where a recording magnetic field that is not effective for the disk 10 is generated. FIG. 10 illustrates a fringe OHF2 from the write head 15W. In addition, FIG. 10 illustrates an assist range OAR3 of the assist element AST2.

In an embodiment illustrated in FIG. 10, the write head 15W is inclined at a predetermined skew angle in the outer direction in the outer circumferential region OR and writes the data OD3 and OD4 to the disk 10. In the embodiment, the MPU 60 sets the assist energy that is generated from the assist element AST2 to be lower than the assist energy that is generated from the assist element AST1, so that the data OD4 overwrites a portion of the data OD3 in the inner direction as shown. Thus, the MPU 60 sets the assist current or the assist voltage that is applied to the assist element AST2 to be lower than the assist current or the assist voltage that is applied to the assist element AST1, so that the data OD4 overwrites a portion of the data OD3 in the inner direction. For example, when the size of the assist energy of the assist element AST2 is 1, the MPU 60 sets the size of the assist energy of the assist element AST1 as 9. Thus, the MPU 60 applies the assist current or the assist voltage having a size of 1 to the assist element AST2 and applies the assist current or the assist voltage having a size of 9 to the assist element AST1, so that the data OD4 overwrites a portion of the data OD3 in the outer direction as shown.

In some embodiments, the MPU 60 further sets the size of the assist energy to be generated and applied from each of the assist elements AST1 and AST2 to the disk 10 based at least in part on the various conditions. For example, the MPU 60 sets the assist current or the assist voltage to be applied to each of the assist elements AST1 and AST2 based at least in part on the various conditions. In some embodiments, the MPU 60 sets the size of the assist energy of the assist element AST2 as 0, so that the data OD4 overwrites in the inner direction a portion of the data OD3. In other words, the MPU 60 sets the assist element AST2 to OFF and sets the assist element AST1 to ON such that the data OD4 overwrites in the inner direction a portion of the data OD3 as shown. Thus, in such an embodiment, the MPU 60 overwrites the data OD4 in the outer direction of the data OD3 without applying the assist current or the assist voltage to the assist element AST1.

In the example illustrated in FIG. 10, the fringe data OOF3 is generated in the data OD3 by the fringe OHF2 of the write head 15W. Since the fringe OHF2 in the outer direction of the write head 15W is small, fringe data is not generated in the outer direction of the data OD3. Similarly, the fringe data OOF4, which has a predetermined size in the radial direction, is generated in the inner direction of the data OD4 by the fringe OHF2 of the write head 15W. Since the fringe OHF2 in the outer direction of the write head 15W is small, fringe data is not generated in the outer direction of the data OD4. In the example illustrated in FIG. 10, fringe data having a smaller size in the radial direction than the size of the fringe data OOF4 in the radial direction may be generated. It is noted that the fringe data OOF3 is overwritten by the next data track that is written in the inner direction from the data OD3 (i.e., the data OD4) and OOF4 is overwritten by the next data track that is written in the inner direction from the data MD4 (not shown). Accordingly, in the example illustrated in FIG. 10, the generation of fringe data in data can be reduced, and the quality of data can be improved.

In the example illustrated in FIG. 10, the write head 15W is inclined at a predetermined skew angle in the outer direction in the outer circumferential region OR and overwrites in the inner direction the data OD4 over a portion of the data OD3. The write head 15W may be inclined at a predetermined skew angle in the outer direction in the outer circumferential region OR and may overwrite in the inner direction the data OD4 over a portion of the data OD3. In this case, the MPU 60 sets the assist current or the assist voltage that is applied to the assist element AST1 to be lower than the assist current or the assist voltage that is applied to the assist element AST2, so that the data OD4 overwrites a portion of the data OD3 in the outer direction as shown.

Figure 11:
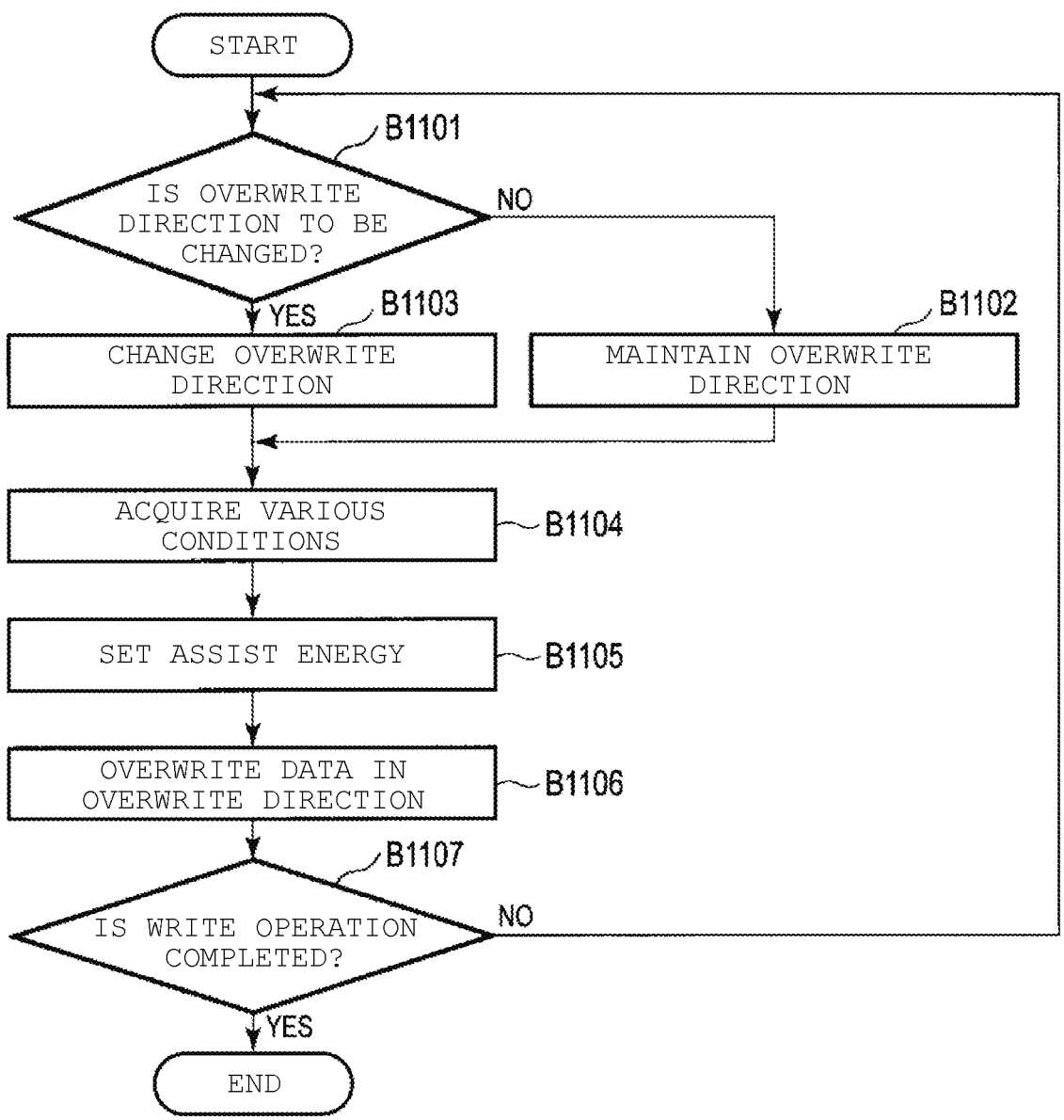
FIG. 11 is a flowchart illustrating an example of a write operation method according to the embodiment.

FIG. 11 is a flowchart illustrating an example a write operation method according to the embodiment.

The MPU 60 determines whether or not to change the overwrite direction (B1101). When the MPU 60 determines not to change the overwrite direction (NO in B1101), the MPU60 maintains the overwrite direction (e.g., as the outer direction) (B1102) and proceeds to a process of B1104. When the MPU 60 determines to change the overwrite direction (YES in B1101), the MPU 60 changes the overwrite direction (B1103) and acquires the various conditions such as the characteristics of the disk 10, the characteristics of the head 15, the recording frequency, and the track pitch (B1104). Depending on the various conditions such as the skew angle, the characteristics of the disk 10, the characteristics of the head 15, the recording frequency, the track pitch, and the overwrite direction, the MPU 60 sets the assist energy (the size thereof) to be generated and applied from each of the assist elements AST to the disk 10 (B1105). It is noted that in some instances, the assist energy generated and applied to the disk 10 from each of the assist elements AST can be different, even while applied simultaneously. For example, depending on the various conditions such as the skew angle, the characteristics of the disk 10, the characteristics of the head 15, the recording frequency, and the track pitch and the overwrite direction, the MPU 60 sets the assist current or the assist voltage to be applied to each of the assist elements AST. The MPU 60 generates and applies the assist energy from each of the assist elements AST to the disk 10 such that data is written in the overwrite direction (B1106). For example, in an embodiment, the MPU 60 applies the assist current or the assist voltage to each of the assist elements AST such that data is written in the overwrite direction. The MPU determines whether or not the write operation is completed (B1107). When the MPU 60 determines that the write operation is not completed (NO in B1107), the MPU 60 proceeds to the process of B1101. When the MPU 60 determines that the write operation is completed (YES in B1107), the MPU 60 ends the process.

In the embodiment, the magnetic disk device 1 includes the write head 15W including the assist elements AST. The magnetic disk device 1 controls the assist energy to be generated and applied from each of the assist elements AST to the disk 10 depending on the overwrite direction. For example, the magnetic disk device 1 controls the assist current or the assist voltage to be applied to each of the assist element AST depending on the overwrite direction. The magnetic disk device 1 sets the assist energy that is generated from the trailing edge assist element AST (which is positioned away from the overwrite direction) to be lower than the assist energy that is generated from the leading edge assist element AST (which is positioned toward from the overwrite direction). For example, when data is overwritten in the outer direction, the magnetic disk device 1 sets the assist current or the assist voltage that is applied to the assist element AST positioned in the inner direction among the assist elements AST to be lower than the assist current or the assist voltage that is applied to the assist element AST positioned in the outer direction among the assist elements AST. Conversely, when data is overwritten in the inner direction, the magnetic disk device 1 sets the assist energy that is generated from the assist element AST positioned in the outer direction among the assist elements AST to be lower than the assist energy that is generated from the assist element AST positioned in the inner direction among the assist elements AST. Thus, when data is overwritten in the inner direction, the magnetic disk device 1 sets the assist current or the assist voltage that is applied to the assist element AST positioned in the outer direction among the assist elements AST to be lower than the assist current or the assist voltage that is applied to the assist element AST positioned in the inner direction among the assist elements AST. Also, when data is overwritten in the outer direction, the magnetic disk device sets the assist current or the assist voltage that is applied to the assist element AST positioned in the inner direction among the assist elements AST to be lower than the assist current or the assist voltage that is applied to the assist element AST positioned in the outer direction among the assist elements AST. Therefore, in so doing, the magnetic disk device 1 can reduce the influence of a fringe from the write head 15W on data written in the disk 10. Accordingly, the magnetic disk device 1 can improve the quality of data.

While certain embodiments have been described these embodiments have been presented by way of example only, and are not intended to limit the scope of claims. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such embodiments or modifications as would fall within the scope and spirit of the invention.

What is claimed is:
1. A magnetic disk device comprising:
a disk;
a head including a main magnetic pole, a write shield that faces the main magnetic pole in a first direction and is separated from the main magnetic pole by a gap, a first assist element that is disposed in the gap, and a second assist element that is disposed in the gap and is positioned relative to the first assist element in a second direction intersecting the first direction; and
a controller configured to:
cause a first assist energy from the first assist element to be applied to the disk and affect a coercive force of the disk; and
cause a second assist energy from the second assist element to be applied to the disk and affect the coercive force of the disk,
wherein the first assist energy is different from the second assist energy, and
wherein the controller determines the first assist energy and the second assist energy based on an overwrite direction in which second data overwrites a portion of first data in a radial direction of the disk.
2. The magnetic disk device according to claim 1, wherein the controller determines the first assist energy and the second assist energy based on the overwrite direction by:
determining that the first assist element is one of a leading edge assist element and a trailing edge assist element;
determining that the second assist element is the other of the leading edge assist element and the trailing edge assist element; and
setting an assist energy of the trailing edge assist element to be less than an assist energy of the leading edge assist element.
3. The magnetic disk device according to claim 2, wherein the controller is further configured to set the assist energy of the trailing edge assist element to be less than the assist energy of the leading edge assist element by setting a first current that is applied to the trailing edge assist element to be lower than a second current that is applied to the leading edge assist element.
4. The magnetic disk device according to claim 1, wherein the overwrite direction corresponds to one of an inner radial direction of the disk and an outer radial direction of the disk.
5. The magnetic disk device according to claim 1, wherein, when the head is positioned relative to the disk with a skew angle of 0°, the first direction is perpendicular to the overwrite direction.
6. The magnetic disk device according to claim 1, wherein the controller is configured to apply a first current to the first assist element and a second current that is different from the first current to the second assist element.
7. A magnetic disk device comprising:
a disk;
a head including a main magnetic pole, a write shield that faces the main magnetic pole in a first direction and is separated from the main magnetic pole by a gap, a first assist element that is disposed in the gap, and a second assist element that is disposed in the gap and is positioned relative to the first assist element in a second direction intersecting the first direction; and
a controller configured to:
cause a first assist energy from the first assist element to be applied to the disk and affect a coercive force of the disk; and cause a second assist energy from the second assist element to be applied to the disk and affect the coercive force of the disk, wherein the first assist energy is different from the second assist energy, and wherein the first assist element comprises a high-frequency assist element that generates and applies a first high-frequency magnetic field to the disk as the first assist energy and the second assist element comprises a high-frequency assist element that generates and applies a second high-frequency magnetic field to the disk as the second assist energy.

8. A magnetic disk device comprising:

a disk;

a head including a main magnetic pole, a write shield that faces the main magnetic pole in a first direction and is separated from the main magnetic pole by a pap, a first assist element that is disposed in the gap, and a second assist element that is disposed in the gap and is positioned relative to the first assist element in a second direction intersecting the first direction; and a controller configured to:
cause a first assist energy from the first assist element to be applied to the disk and affect a coercive force of the disk; and
cause a second assist energy from the second assist element to be applied to the disk and affect the coercive force of the disk,
wherein the first assist energy is different from the second assist energy, and
wherein the first assist element comprises a thermal assist element that irradiates the disk with first near-field light as the first assist energy and the second assist element comprises a thermal assist element that irradiates the disk with second near-field light as the second assist energy.

9. A write operation method that is applied to a magnetic disk device, the magnetic disk device including a disk and a head, the head including a main magnetic pole, a write shield that faces the main magnetic pole in a first direction and is separated from the main magnetic pole by a gap, a first assist element that is disposed in the gap, and a second assist element that is disposed in the gap and is positioned relative to the first assist element in a second direction intersecting the first direction, and the write operation method comprising:

causing a first assist energy from the first assist element to be applied to the disk and affect a coercive force of the disk;

causing a second assist energy from the second assist element to be applied to the disk and affect the coercive force of the disk; and determining the first assist energy and the second assist energy based on an overwrite direction in which second data overwrites a portion of first data in a radial direction of the disk, wherein the first assist energy is different from the second assist energy, and wherein the second direction corresponds to the radial direction of the disk.

10. The write operation method according to claim 9, wherein determining the first assist energy and the second assist energy based on the overwrite direction comprises:

determining that the first assist element is one of a leading edge assist element and a trailing edge assist element;

determining that the second assist element is the other of the leading edge assist element and the trailing edge assist element; and setting an assist energy of the trailing edge assist element to be less than an assist energy of the leading edge assist element.

11. The write operation method according to claim 10, wherein setting the assist energy of the trailing edge assist element to be less than the assist energy of the leading edge assist element comprises:

setting a first current that is applied to the trailing edge assist element to be lower than a second current that is applied to the leading edge assist element.

12. The write operation method according to claim 9, wherein the overwrite direction corresponds to one of an inner radial direction of the disk and an outer radial direction of the disk.

13. The write operation method according to claim 9, wherein, when the head is positioned relative to the disk with a skew angle of 0°, the first direction is perpendicular to the overwrite direction.

14. The write operation method according to claim 9, further comprising:

applying a first current to the first assist element and a second current that is different from the first current to the second assist element.

15. The write operation method according to claim 9, wherein the first assist element comprises a high-frequency assist element that generates and applies a first high-frequency magnetic field to the disk as the first assist energy and the second assist element comprises a high-frequency assist element that generates and applies a second high-frequency magnetic field to the disk as the second assist energy.

* * * * *

UNITED STATES PATENT AND TRADEMARK OFFICE
CERTIFICATE OF CORRECTION

PATENT NO. : 11,114,127 B2
APPLICATION NO. : 16/806585
DATED : September 7, 2021
INVENTOR(S) : Hiroyuki Suzuki et al.

It is certified that error appears in the above-identified patent and that said Letters Patent is hereby corrected as shown below:

In the Claims

In Column 21, Line 18, please replace "pap" with --gap--.

Signed and Sealed this
First Day of November, 2022

Katherine Kelly Vidal
*Director of the United States Patent and Trademark Office*